(12) United States Patent
Roberge

(10) Patent No.: US 9,084,394 B2
(45) Date of Patent: Jul. 21, 2015

(54) CONTINUOUS CROP ACCUMULATOR FOR AGRICULTURAL HARVESTERS

(71) Applicant: CNH CANADA, LTD., Saskatoon (CA)

(72) Inventor: Martin J. Roberge, Saskatoon (CA)

(73) Assignee: CNH Industrial Canada, LTD, Saskatchewan (CA)

( * ) Notice: Subject to any disclaimer, the term of this patent is extended or adjusted under 35 U.S.C. 154(b) by 111 days.

(21) Appl. No.: 13/774,909

(22) Filed: Feb. 22, 2013

(65) Prior Publication Data

US 2014/0237981 A1    Aug. 28, 2014

(51) Int. Cl.
| | |
|---|---|
| A01D 39/00 | (2006.01) |
| A01D 43/02 | (2006.01) |
| A01D 75/00 | (2006.01) |
| A01F 17/02 | (2006.01) |
| A01D 46/08 | (2006.01) |
| A01D 82/00 | (2006.01) |
| A01F 15/07 | (2006.01) |
| A01F 15/10 | (2006.01) |
| A01D 87/02 | (2006.01) |

(52) U.S. Cl.
CPC ............... *A01F 17/02* (2013.01); *A01D 46/08* (2013.01); *A01D 82/00* (2013.01); *A01D 87/02* (2013.01); *A01F 15/07* (2013.01); *A01F 15/0705* (2013.01); *A01F 15/10* (2013.01); *A01F 15/106* (2013.01)

(58) Field of Classification Search
USPC ............ 56/341; 100/88, 40; 53/118, 116, 176
See application file for complete search history.

(56) References Cited

U.S. PATENT DOCUMENTS

| | | |
|---|---|---|
| 2,292,280 A | 8/1942 | McGuire |
| 4,009,559 A | 3/1977 | Mast |
| 4,011,711 A | 3/1977 | Mast |
| 4,022,003 A | 5/1977 | Strausser et al. |
| 4,035,999 A | 7/1977 | Crane et al. |
| 4,045,947 A | 9/1977 | Mast |
| 4,052,841 A | 10/1977 | Rice et al. |
| 4,057,954 A | 11/1977 | Mast |
| 4,062,172 A | 12/1977 | Rice et al. |
| 4,172,354 A | 10/1979 | Vermeer et al. |
| 4,258,619 A | 3/1981 | Gaeddert |

(Continued)

FOREIGN PATENT DOCUMENTS

| | | |
|---|---|---|
| DE | 2634638 A1 | 2/1978 |
| DE | 3415310 A1 | 10/1985 |

(Continued)

OTHER PUBLICATIONS

Anderson et al., United States Statutory Invention Registration No. H1,826, Published Jan. 4, 2000.

(Continued)

*Primary Examiner* — Árpád Fábián-Kovács
(74) *Attorney, Agent, or Firm* — Patrick M. Sheldrake; Seyed V. Sharifi T.

(57) ABSTRACT

A conveyor system that may be used with an agricultural harvester, such as a round baler, waste baler, combine, sugarcane harvester or cotton harvester. More particularly, the conveyor system utilizes at least a first and a second conveyor belt of which at least one of the conveyor belts is independently movable in the forward and backward directions. The speed and direction of the conveyor belts can be controlled to perform continuous baling of harvested crop in the agricultural baler.

17 Claims, 16 Drawing Sheets

(56) References Cited

U.S. PATENT DOCUMENTS

| | | | |
|---|---|---|---|
| 4,262,478 A * | 4/1981 | Pentith | 56/341 |
| 4,433,619 A | 2/1984 | Anstey et al. | |
| 4,499,714 A * | 2/1985 | Hollmann | 56/341 |
| 4,510,861 A | 4/1985 | Campbell et al. | |
| 4,514,969 A | 5/1985 | Moosbrucker et al. | |
| 4,534,285 A | 8/1985 | Underhill | |
| 4,542,617 A | 9/1985 | Sonntag | |
| 4,580,398 A | 4/1986 | Bruer et al. | |
| 4,584,827 A | 4/1986 | Merkey et al. | |
| 4,597,248 A | 7/1986 | Campbell et al. | |
| 4,597,249 A | 7/1986 | Bowden | |
| 4,597,254 A | 7/1986 | Bowden | |
| 4,625,502 A | 12/1986 | Gerhardt et al. | |
| 4,667,592 A | 5/1987 | Pentith et al. | |
| 4,838,016 A * | 6/1989 | Frogbrook et al. | 56/341 |
| 4,912,914 A * | 4/1990 | Wingard | 56/16.4 B |
| 4,914,900 A | 4/1990 | Viaud | |
| 5,115,734 A | 5/1992 | Quartaert | |
| 5,255,501 A | 10/1993 | McWilliams | |
| 5,630,313 A * | 5/1997 | Von Allworden et al. | 56/16.4 B |
| 5,941,168 A | 8/1999 | Kluver et al. | |
| 6,032,446 A | 3/2000 | Gola et al. | |
| 6,170,245 B1 | 1/2001 | Underhill | |
| 6,295,797 B1 | 10/2001 | Naaktgeboren et al. | |
| 6,467,237 B2 | 10/2002 | Viaud | |
| 6,622,468 B2 | 9/2003 | Lucand et al. | |
| 6,640,699 B2 | 11/2003 | Viaud | |
| 6,644,006 B1 | 11/2003 | Merritt et al. | |
| 6,675,561 B2 | 1/2004 | Davis et al. | |
| 6,688,092 B2 | 2/2004 | Anstey et al. | |
| 6,729,118 B2 | 5/2004 | Viaud | |
| 6,745,680 B2 | 6/2004 | Viaud et al. | |
| 6,877,304 B1 | 4/2005 | Smith et al. | |
| 7,055,425 B2 | 6/2006 | Viaud et al. | |
| 7,114,435 B2 | 10/2006 | Viaud et al. | |
| 7,140,294 B1 | 11/2006 | Anstey et al. | |
| 7,162,951 B2 | 1/2007 | Viaud et al. | |
| 7,165,491 B2 | 1/2007 | Viaud | |
| 7,171,892 B2 | 2/2007 | Viaud | |
| 7,222,566 B2 | 5/2007 | Biziorek | |
| 7,275,360 B2 | 10/2007 | Viaud | |
| 7,331,280 B2 | 2/2008 | Viaud | |
| 7,380,496 B2 | 6/2008 | Viaud | |
| 7,404,356 B2 | 7/2008 | Viaud | |
| 7,509,785 B2 | 3/2009 | Fukumori et al. | |
| 7,568,425 B2 | 8/2009 | Viaud | |
| 7,631,716 B2 | 12/2009 | Fox et al. | |
| 7,640,721 B2 | 1/2010 | Viaud et al. | |
| 7,640,852 B1 | 1/2010 | Anstey et al. | |
| 7,779,755 B2 | 8/2010 | De Rycke et al. | |
| 7,818,954 B2 | 10/2010 | Rempe et al. | |
| 7,918,069 B2 | 4/2011 | Viaud | |
| 8,230,663 B2 | 7/2012 | Viaud | |
| 8,281,713 B2 | 10/2012 | Viaud | |
| 8,291,687 B2 | 10/2012 | Herron et al. | |
| 8,627,765 B2 | 1/2014 | Reijersen Van Buuren | |
| 2010/0267432 A1 | 10/2010 | Roberge et al. | |
| 2011/0023442 A1 | 2/2011 | Herron et al. | |
| 2011/0168038 A1 | 7/2011 | Viaud et al. | |
| 2013/0036921 A1 * | 2/2013 | Horstmann | 100/5 |

FOREIGN PATENT DOCUMENTS

| | | | |
|---|---|---|---|
| DE | 102005020777 A1 * | 11/2006 | A01F 15/07 |
| DE | 202010001105 U1 | 4/2010 | |
| EP | 0254337 A1 | 1/1988 | |
| EP | 0350514 A1 | 1/1990 | |
| EP | 2220929 A1 | 8/2010 | |
| EP | 1836890 B1 | 11/2010 | |
| GB | 695478 | 8/1953 | |
| GB | 2169847 A | 7/1986 | |
| WO | 84/02253 A1 | 6/1984 | |

OTHER PUBLICATIONS

Elema H M, "Persen voor grote pakken", Landbouwmechanisatie, Dec. 1, 1974, 1129-1133, vol. 25, No. 12, Netherlands.

* cited by examiner

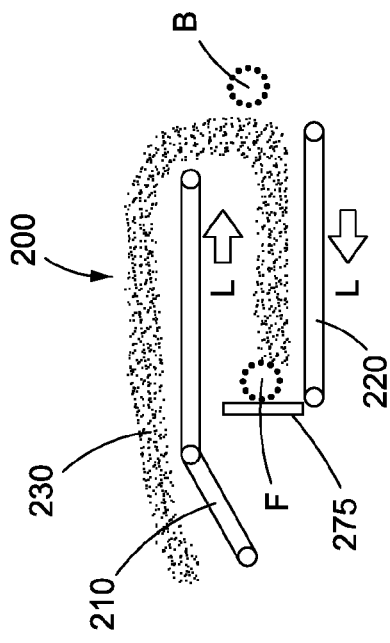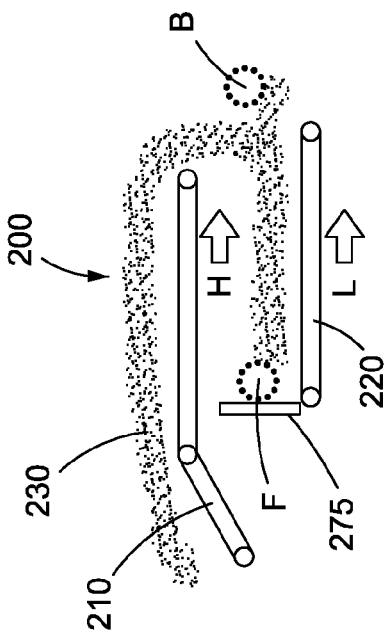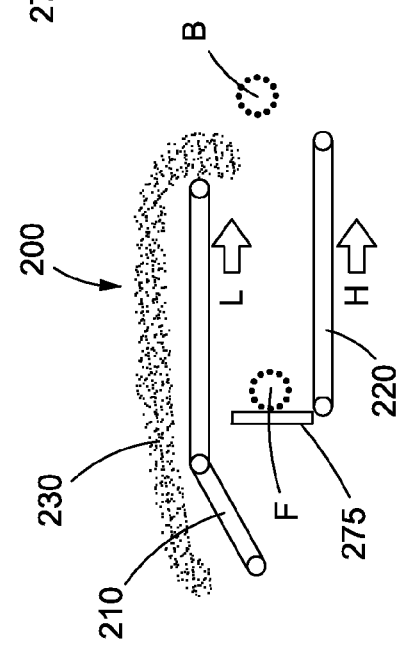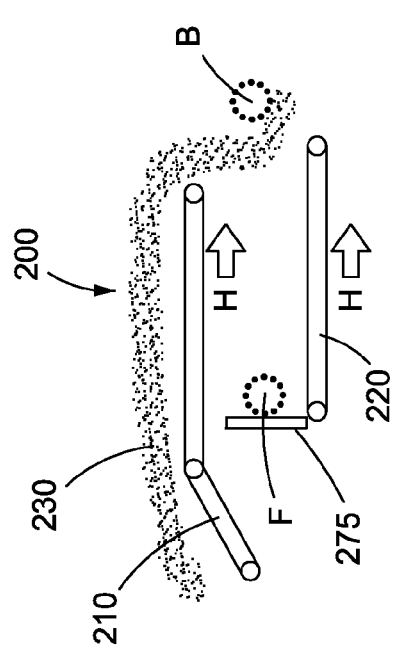

CONTINUOUS CROP ACCUMULATOR FOR AGRICULTURAL HARVESTERS

TECHNOLOGY FIELD

The present invention relates to a device and system for the continuous harvesting of crop in an agricultural harvester, and more particularly, to a crop collection device comprising a first and second conveyor, each conveyor in operable contact with one plurality of drive rolls; a conveyor outlet; wherein at least one conveyor is independently movable in a direction toward the outlet and in a direction opposite of the outlet. The conveyor allows for continuous harvesting and temporary storage of crop in the agricultural harvester while the agricultural harvester bales and ejects harvested crop material.

BACKGROUND

Conventional round balers receive crop and form the crop into compacted bales in a bale forming chamber. There are generally three major cycles in the operation of a round baler: a bale-forming cycle, a bale-wrapping cycle, and a bale-ejecting cycle. A round baler is typically powered and towed by a tractor. A crop pickup picks up material lying on the ground and feeds it to the bale forming belts of the baler to form a bale.

Once the bale forming cycle is complete and the bale fully formed, the towing vehicle may stop and a bale wrapping cycle may begin. For example, once a bale reaches a desired size and/or shape, the operator stops the forward motion of baling belts and stops providing crop to the baler so that a baler can perform wrapping operations. With the forward motion of the baler stopped, mesh, twine, is wrapped around the bale using an automated mechanism associated with the bale chamber.

Once wrapping is complete, a bale ejecting cycle may begin in which the bale chamber is opened, typically by lifting a tailgate, and the wrapped bale falls or is pushed out of the bale chamber. After ejection, the bale forming cycle is restarted for a new bale and the operator once again provides crop to the baler and moves the baler through the field.

Current continuous round balers allow for adjustable speed of a single crop feeding mechanism that funnels crop material into an aligned baler. Such systems, however, have a single conveyor belt that is prone to jam when in operation. The agricultural harvesters of the instant invention provide at least two conveyors, at least one of which being independently movable in both the forward and aft directions. In some embodiments, crop materials can be transiently stored on at least one of the conveyors to reduce speed of feeding crop material into a baling mechanism and prevent jams to the harvesting or baling equipment.

SUMMARY OF THE INVENTION

Embodiments of the present invention provide a crop collection device comprising at least a first conveyor and a second conveyor, and a crop outlet positioned at the most rearward end of the crop collection device. In some embodiments, the crop collection device comprises a third conveyor. In some embodiments, the crop collection device outlet is adapted to align at least one conveyor to the inlet of a bale chamber. In some embodiments, the crop collection device feeds harvested crop material into a bale chamber by conveying crop from a first conveyor to the second conveyor and then finally to the bale chamber. In some embodiments, the first conveyor (a top conveyor) is positioned over the second conveyor (a bottom conveyor), and each of the first and second conveyors are independently movable in the forward and aft directions.

The invention further relates to an agricultural harvester that comprises a crop collection device and a bale ejection system with increased efficiency for continuous operation. In some embodiments, the crop collection device is a component of an agricultural harvester. In some embodiments, the invention relates to an agricultural harvester comprising a bale ejection system that comprises at least one pair of parallel arms that extend transversely from the sidewalls of a bale chamber at least one pair of pivot points. When activated by the operator of the bale ejection system, the at least one pair of arms attached to tension actuators and (stationary) sidewalls raise simultaneously to expose an outlet through which the bale may be ejected. In some embodiments, a netted bale becomes ejected by one or more conveyer belts or baling belts that exert a rearward force on the bale within the bale chamber. The bale becomes ejected through the outlet onto a field upon which the agricultural harvester is operating.

Embodiments of the present invention provide a crop collection device comprising at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction.

In some embodiments, the invention relates to a crop collection device comprising at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, and wherein at least one or a plurality of conveyor belts on the first and the second conveyors are independently movable a forward and aft direction.

In some embodiments, the invention relates to a crop collection device comprising at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, and wherein at least a portion of the first conveyor is positioned above the second conveyor and configured to feed material from the first conveyor to the second conveyor.

In some embodiments, the invention relates to a crop collection device comprising at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, and wherein the crop outlet is adapted for alignment with an inlet of bale chamber on an agricultural harvester. In some embodiments, the crop outlet is adapted for alignment with an inlet of bale chamber on an agricultural harvester so that crop material from at least one conveyor of the crop collection device is fed into a rotary feeder positioned at the base of a bale chamber.

In some embodiments, the invention relates to a crop collection device comprising at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, and wherein the crop inlet is configured to receive crop. In some embodiments, the crop inlet is configured alignment with an outlet of a pickup assembly or for alignment with a feed tube of a combine.

In some embodiments, the invention relates to a crop collection device comprising at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, wherein the first conveyor comprises at least a first and a second section; wherein the first section is angled upward from and proximate to the front end of the crop collection device and wherein the first section is defined by a distance between a roll at the first section's most frontward point to an inflection point on the first conveyor; and wherein a second section is substantially horizontal or at a slight downward angle and is positioned above the second conveyor; and wherein the second conveyor optionally comprises a drive roll at the rearmost end of the second conveyor.

The invention also relates to an agricultural harvester comprising: a bale chamber comprising a first sidewall and a second sidewall; an inlet at the front of the bale chamber an outlet at the rear of the bale chamber; and a crop collection device adapted for alignment with the inlet of the bale chamber; wherein the crop collection device comprises at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction.

In some embodiments, the agricultural harvester comprises: a bale chamber comprising a first sidewall and a second sidewall; an inlet at the front of the bale chamber an outlet at the rear of the bale chamber; and a crop collection device adapted for alignment with the inlet of the bale chamber; wherein the crop collection device comprises at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction.

In some embodiments, the invention relates to an agricultural harvester comprising: a bale chamber comprising a first sidewall and a second sidewall; an inlet at the front of the bale chamber an outlet at the rear of the bale chamber; and a crop collection device adapted for alignment with the inlet of the bale chamber; wherein the crop collection device comprises at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction; wherein agricultural harvester further comprises a bale carrier movable among a closed position and one or more open positions, comprising: at least a first pair of arms extending transversely from and affixed to a first pair of pivot points on the first and second sidewalls; one or more fixed members positioned at a distance defined by the length of the first pair of arms; and a pair of parallel bars affixed to the one or more fixed members.

In some embodiments, the invention relates to an agricultural harvester, wherein the agricultural harvester is selected from a round baler, cotton harvester, sugarcane harvester, waste baler, or combine.

In some embodiments, the invention relates to an agricultural harvester wherein the agricultural harvester is a baler and wherein the bale chamber is defined in a space between the first sidewall, the second sidewall, a plurality of rollers positioned between and attached to the first and second sidewalls; wherein the plurality of rollers support one or a plurality of baling belts.

In some embodiments, the invention relates to an agricultural harvester, wherein the agricultural harvester is a baler that comprises: (a) a bale carrier comprising: at least a first pair of arms extending transversely from and affixed to a first pair of pivot points on the first and second sidewalls; one or more fixed members positioned at a distance defined by the length of the first pair of arms; (b) a motor; and (c) at least one tensioning actuator operatively coupled to the first pair of arms for facilitating the upward or downward movement of the bale carrier.

In some embodiments, the invention relates to a crop collection device, wherein the crop collection device comprises at least one crop deflection panel that is independently movable on a pivot point positioned at the frontward end of the second conveyor between the first and second conveyors in its closed position.

In some embodiments, the invention relates to a crop collection device, wherein the at least one crop deflection panel is configured to allow harvested crop material to clear the second conveyor when the at least one crop deflection panel is in an open position and the one or a plurality of conveyor belts on the second conveyor is moving in a frontward direction.

In some embodiments, the invention relates to a crop collection device, wherein the crop collection device further comprises: (a) an auger or a chopper; and (b) a pickup assembly.

In some embodiments, the invention relates to a crop collection device, wherein the crop collection device, wherein the second conveyor is positioned substantially horizontally underneath the first conveyor and is independently movable in the forward and aft directions.

In some embodiments, the invention relates to a crop collection device, wherein the crop collection device further comprises: at least one controller configured to vary the speed and direction of movement of the at least one conveyor.

In some embodiments, the invention relates to a method of harvesting crop material comprising: (a) receiving crop material at a crop collection device; and (b) varying the speed and direction of the at least one conveyor to feed the crop material from the second conveyor through either the crop outlet or an opening uncovered by at least one crop deflection panel, wherein the crop collection device comprises at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction.

In some embodiments, the invention relates to a method of harvesting crop material comprising: (a) receiving crop material at a crop collection device; and (b) varying the speed and direction of the at least one conveyor to feed the crop material from the second conveyor through either the crop outlet or an opening uncovered by at least one crop deflection panel, wherein the crop collection device comprises at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, wherein at least a portion of the first conveyor is positioned above the second conveyor and wherein the step of varying the speed and direction of the at least one conveyor is determined by at least one sensor positioned at or proximate to the second conveyor that determines whether crop material is present or accumulating on the second conveyor. In some embodiments, the at least one sensor is chosen from: an optical sensor, an ultrasonic sensors, and a contact sensor.

In some embodiments, the invention relates to a method of harvesting crop material comprising: (a) receiving crop material at a crop collection device; and (b) varying the speed and direction of the at least one conveyor to feed the crop material from the second conveyor through either the crop outlet or an opening uncovered by at least one crop deflection panel, wherein the crop collection device comprises at least a first conveyor, a second conveyor, a crop inlet positioned at a front end of the crop collection device, and a crop outlet positioned at a rear end of the crop collection device; wherein the first and second conveyors comprise one or a plurality of conveyor belts rotatably mounted on a set of rolls; and wherein at least one or a plurality of conveyor belts on at least one of the first or second conveyors is independently movable in a forward and aft direction, wherein the step of varying the speed and direction of the at least one conveyor is determined by a plurality of sensors positioned at or proximate to the second conveyor that determine whether crop material is present or accumulating on the second conveyor. In some embodiments, the plurality of sensors are optical sensors, ultrasonic sensors, contact sensors, or a combination thereof.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 2A through FIG. 2E illustrate sequential stages for harvesting using two conveyors of the crop collection device according to an embodiment.

DETAILED DESCRIPTION OF ILLUSTRATIVE EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

As used herein the term "inflection point" of a conveyor means the point of the conveyor where the direction of the conveyor pivots from one angle to another angle thereby altering the direction of the conveyor belt or belts mounted on the conveyor. In some embodiments, the term "inflection point" of a conveyor means the point of the conveyor where the direction of the conveyor pivots from an angled position to a substantially horizontal position. In some embodiments, one or a plurality of an idler roll or drive roll defines one or more inflection points of the conveyor.

Figure 1:
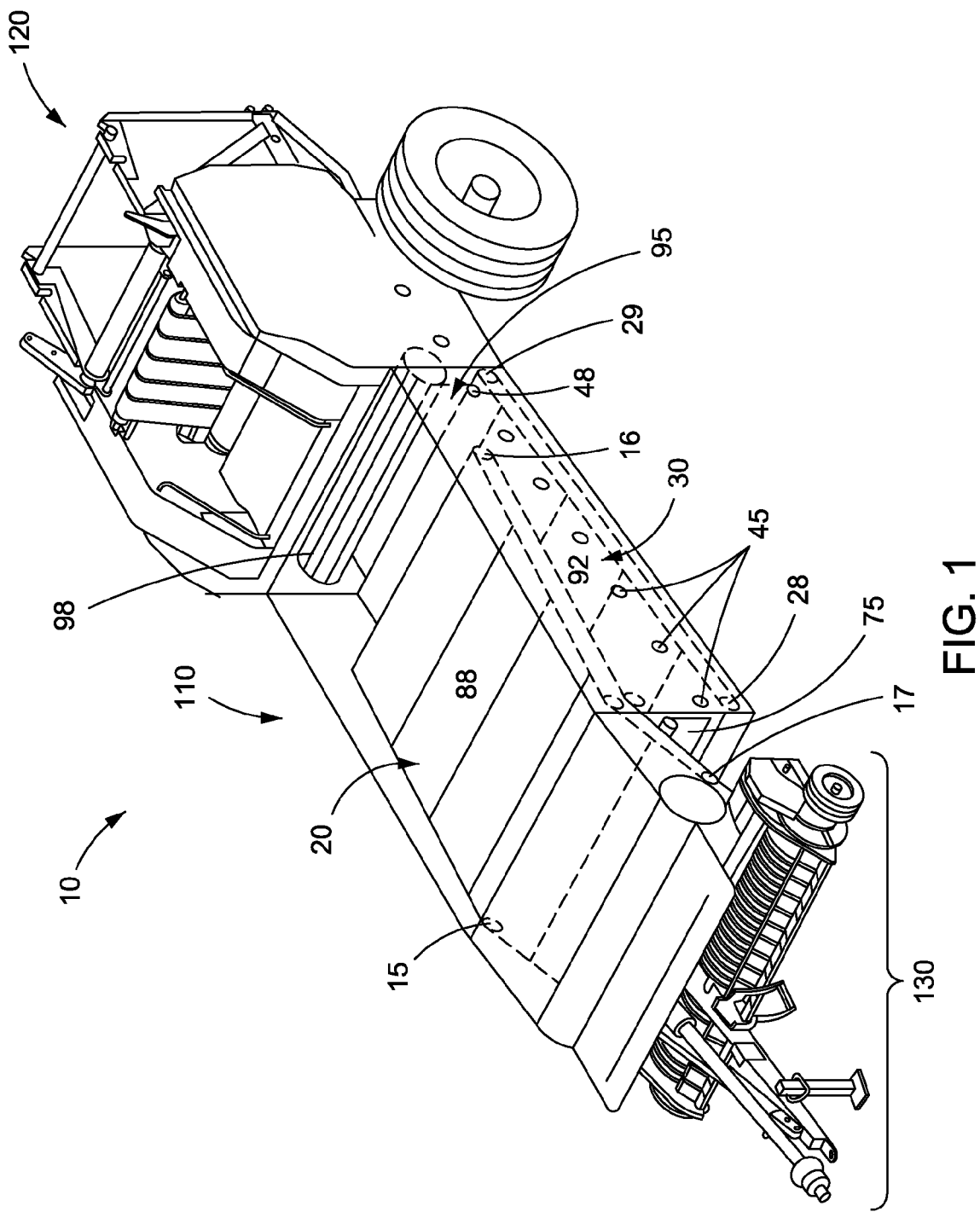
FIG. 1 is a perspective view of an agricultural harvester comprising a crop collection device and pickup assembly.

FIG. 1 shows an exemplary agricultural harvester 10, which may also be referred as a baler or harvester throughout this specification. As shown in FIG. 1, the depicted embodiment of the harvester 10 includes a pickup assembly 130, sequentially and longitudinally arranged with a crop collection device 110, and a baler 120 that comprises a bale chamber (not shown). The crop collection device 110 may have side walls (shown as transparent frames in the depicted embodiment) as well as a top and a bottom surface that define a cavity comprising a first conveyor 20 positioned over a second conveyor 30. In some embodiments, the top surface of the crop collection device may be partially or wholly absent to allow threshed crop material including, for example, grain, straw, legumes, and the like, to enter through the top of the device via a combine feed tube to which the crop collection device may be attached by a tow.

As shown, the crop collection device 110 is adapted to align its front end with a pickup assembly 130, which receives a flow of crop material from the ground and feeds the crop material onto a first, or top, conveyor 20. The top conveyor 20 comprises a single endless conveyor belt rotatably mounted on rolls 15, 16, 17, although the conveyor may comprise any number of conveyor belts conventionally supported by a plurality of rolls and rotatable in a direction or directions about the positions of the plurality of rolls. In some embodiments, the crop collection device 110 is adapted for use with a round baler and can include a conveyor having a plurality of endless belts that are wrapped around rolls for movement. As shown and in some embodiments, a first idler roll 17 is positioned lower than a second idler roll 15 to feed crop material from the pickup assembly 130 to a position higher than the bottom conveyor 30. The height of the idler roll 17 of the top conveyor 20 defines the space between the top conveyer 20 and the bottom conveyor 30 allowing for capacity of harvested crop material while the crop collection device 110 is in varying stages of its operating cycle. A drive roll 16 is operably connected to a controller which can be addressed by a user to vary the speed and direction of the conveyor belt of the top conveyor 20. The top surface 88 of the top conveyor belt defines a movable accumulating and conveying surface for receiving and conveying crop material provided to the top conveyor 20 from a pickup assembly 130 through an open crop inlet (not depicted) of the crop collection device 110. A top crop deflection panel (not shown) in its closed position may fill a space between the pickup assembly 130 and the top conveyor 20. The top conveyor belt surface 88 may be arranged so that the conveyor belt of the top conveyor 20 extends from the second idler roll 17 to the drive roll 16 on a slight downward incline. The downward incline of the top conveyor 20 allows clearance of flowing crop material from the top surface of the top conveyor 88 to the top surface 92 of the second, or bottom, conveyor 30.

In an embodiment, the top surface 92 of the conveyor belt on the bottom conveyor 30 is substantially horizontal and extends from a forward position of the crop collection device 110 at an idler roll 28 to a drive roll 29 positioned adjacent to a rear or output end 95 of the crop collection device 110. The position of the second conveyor allows movement of crop material from the second conveyor to either: (1) the inlet of the bale chamber proximate to a rotary feeder 98 of the baler 120 if the top surface 92 of the conveyor belt of the bottom conveyor 30 moves toward the back of the crop collection device 110; or (2) or the crop deflection panel 75 positioned adjacent to the front end of the second conveyor 30. The crop deflection panel 75 extends the entire width of the forwardmost side panel of the crop collection device 110 at its lower edge and covers an access outlet (not depicted) through which excess crop material may exit if maintenance is required or if crop material on the second conveyor builds up to undesirable levels or if crop material prevents the normal function of the second conveyor 30. The crop deflection panel 75 is arranged axially but transverse to the bottom conveyor 30 and extends lengthwise from a pivot point along its length. The crop deflection panel 75 is in operable communication with at least one controller that allows upon engaging the at least one controller by the operator radial movement from its closed position to an open position defined by the length of the panel 75.

It will be recognized that, in some embodiments, the arrangement of the at least first and second conveyors allows for one or a plurality of endless conveyor belts, chains, augers, or other means to convey crop materials from position within the crop collection device to another position within the crop collection device. In some embodiments, the crop collection device comprises one or a plurality of crop beaters, crop augers, or crop disturbance devices (such as rotary tines). In some embodiments, the crop collection device comprises one or a plurality of crop beaters, crop augers, or crop disturbance devices (such as rotary tines) positioned at or proximate to an inflection point on the path through which harvested crop material passes in the device. In some embodiments the belts, chains, augers, or the like may be driven by at least one drive roll whose rotation results in movement of the belts. At least one drive roll may in turn be powered by a hydraulic motor operated by a conventional means known by those in the art. For example, in some embodiments, fluid may be provided to the hydraulic motor from a hydraulic pump and manipulated by solenoids and/or flow control valves to vary the fluid flow to vary the speed of the motor. At least one drive roll may be coupled to the motor by a chain or other means as known in the art so that by varying the speed of the motor varies the rotation of the drive roll and the conveyor belts powered by the drive roll. This arrangement allows the movement of the conveyor belts to be controlled by at least one controller. The at least one controller may also manipulate other components of the crop collection device, pickup assembly or baler components of an agricultural harvester related to the crop collection device's various stages of its operation. It should be noted that while a single controller can control both the first conveyor and second conveyor in addition to crop collection device's stages of operation, multiple controllers could be used to accomplish the same tasks.

In the depicted embodiment, a plurality of sensors 45 are positioned along the side of the crop collection device and in the space between the first conveyor 20 and the second conveyor 30. The plurality of sensors 45 can be used by the at least one controller to signal to the operator when and in what manner to initiate a stage in the crop collection device 110 operation cycle. The plurality of sensors 45 can prompt the operator to change the speed and direction of conveyor belt movement of the top conveyor 20 and/or the bottom conveyor 30. At least one rearmost sensor 48 is positioned at or proximate to the crop outlet 95 to allow monitoring of the levels of crop material entering the bale chamber of the baler 120. The at least one rearmost sensor 48 also can prompt the operator if an when transiently stored crop being collected on the surface of the bottom conveyor belt 92 in the stage of operation comprising bale ejection. Each of the various components of the crop collection device 110 or agricultural harvester 10 may have an associated controller and sensor for changing operating parameters of the component from the cab while the device or agricultural harvester is in operation. In some embodiments, one or a plurality of sensors is positioned at or proximate to a chopper, a net wrapping device, and/or a bale chamber. Thus, the operator of the crop collection device 110 or agricultural harvester 10 may change the parameters of the crop collection device 110 and see, on a display in the cab of a tractor or other equipment (such as a combine) towing the harvester 10, if that change impacts the harvesting performance of the crop collection device 110.

In some embodiments, the parameters of the crop collection device 110 may be pre-programmed to automatcially alter harvest performance under predetermined conditions.

FIG. 2 depicts various stages of an embodiment's operating cycle. An exemplary harvest cycle begins at the step depicted in FIG. 2A during which the first, or top, conveyor 210 receives flowing crop material 230 from a crop source and conveys the crop material 230 across the top side of the conveyor toward the rear of the crop collection device. The top conveyor 210 clears the flowing crop material 230 to a second, or bottom, conveyor 220 that further conveys crop to an adjacent baler (not depicted). A front sensor F is positioned at or proximate to the front of the second conveyor 220, which monitors the presence of crop. In this embodiment, front sensor F is an optical sensor that sends a signal through a controller to the operator when the sensor is blocked by the presence of crop material 230. A rear sensor B is positioned at or proximate to the back of the second conveyor 220. Both the top conveyor 210 and the bottom conveyor 220 are running on a high speed H toward the rear of the crop collection device indicated by arrows pointing to the right. In some embodiments, Sensors F and B may be components of a plurality of sensors depicted as 45 in FIG. 1.

Once a sensor in the baling mechanism (not depicted) indicates that the growing bale has reached approximately 95% of its desired size, FIG. 2B depicts that the operator may lower the speed of the top conveyor 210 to a relatively low speed L but maintains the direction of the top conveyor toward the rear of the crop collection device. Concurrently, the bottom conveyor 220 maintains its speed and direction to allow the bale to continue growing the bale to 100% of its desired size. Rear sensor B is occluded by the presence of the flowing crop material 230 being sent to the baling mechanism. Front sensor F is clear of crop material 230.

FIG. 2C depicts the complete clearance of crop material 230 from the bottom conveyor 220 while the relatively low speed L and the relatively high speed H are maintained in their respective conveyors. The absence of flowing crop material 230 in the rear of the crop collection device 200 is depicted by the clear rear sensor B. When rear sensor B indicates that the crop material 230 is no longer present, the operator can initiate an operating step comprising a conventional bale net wrapping known to those in the art. Alternatively, in some embodiments, software automatically initiates an operating step comprising a conventional bale net wrapping known to those in the art when rear sensor B indicates that the crop material 230 is no longer present.

FIG. 2D depicts an operating step of the crop harvesting process in the crop collection device 200 whereby the operator initiates transient storage of crop material 230 on the top surface second conveyor 220 while a wrapped bale is being ejected from the adjacent bale chamber (not shown). To direct the movement of the crop material away from the adjacent baling mechanism and prevent clogging of the crop collection device 200 while continuously harvesting crop material 230 on the top conveyor 210, the speed of the bottom conveyor 220 is reduced and the direction of the conveyor belt is reversed toward the front of the crop collection device 200. Rear sensor B remains clear and the operator can monitor the front sensor F to identify when the crop material 230 reaches the cavity adjacent to the crop deflection panel 275. As the crop material 230 approaches the crop deflection panel 275, the operator may then eject the wrapped bale from the bale chamber.

FIG. 2E depicts another operating step in a method of a crop harvesting embodiment in which the operator may begin to grow the new bale by moving the crop material 230 temporarily stored on the second conveyor 220 toward the baling mechanism. The speed of the bottom conveyor 220 is maintained at a relatively slow speed L so as not to cause a plug at the crop outlet of the crop collection device 200, however, the direction of the conveyor belt of the second conveyor 220 is reversed to direct crop material 230 into the baling chamber. The low speed L of the bottom conveyor 220 is maintained until the crop material 230 on the conveyor is fed completely into the adjacent bale chamber. The front sensor F indicates that the sensor is clear of transiently stored crop material 230, though other sensors may line the second conveyor belt path to prompt to the operator when the transiently stored crop material 230 has been fully transferred to the bale chamber. Once the crop material from the second conveyor 220 has been fully transferred, the first step of the operating cycle depicted in FIG. 2A may be initiated by increasing the speed of the second conveyor 220 to a high speed H. Increasing the speed of the second conveyor 220 resumes growth of the bale from the crop material 230 on the first conveyor 210. The entire cycle can be repeated for growth of the bale in a continuous fashion. Variable speeds and direction of the conveyor belt movement can be controlled manually by the operator so that corrections in crop collection process may be accommodated. For instance, in some embodiments, if crop material 230 accumulates too quickly in the second conveyor 220, the operator may slow the speed of both conveyors simultaneously to decrease the rate of crop material 230 pickup. In some embodiments, if crop material 230 clogs or jams normal operation or speed of the crop collection device on the second conveyor 220, the operator can engage a controller to open the crop deflection panel 275 and allow crop material 230 to flow out of the crop collection device 220 (while the machine is at rest or while the machine is not harvesting). In some embodiments, if crop material 230 clogs or jams normal operation or speed of the crop collection device 200 at or proximate to the first conveyor 210, the operator can engage a controller to open an option top crop deflection panel (not shown) and allow crop material to flow out of the crop collection device 200 and fall between the pickup assembly and a first, or top, conveyor 210. Movement of the crop material 230 out of the crop collection device 200 from the top conveyor will be driven by the operator controlled directional movement of the top conveyor's drive roll (not shown).

Figure 3:
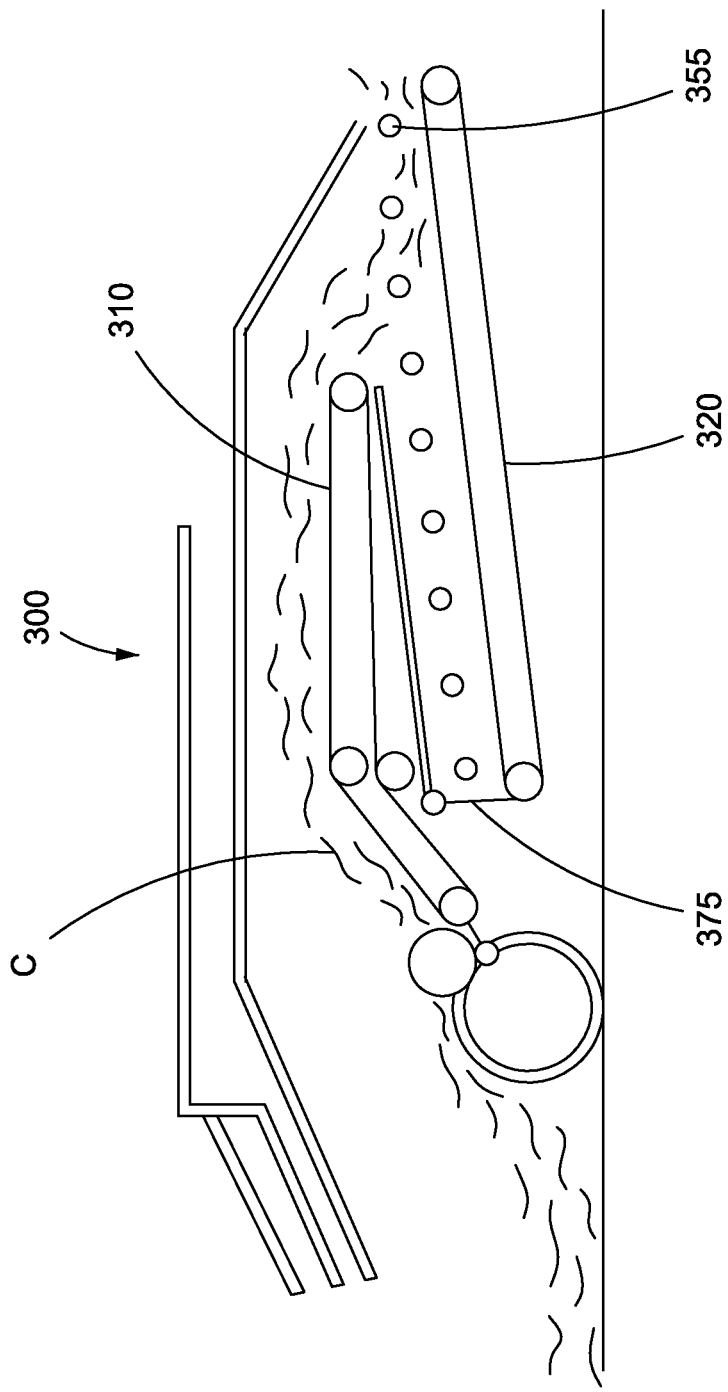
FIG. 3 is a side view of the crop collection device according to an embodiment illustrating various sensor positions along the length of the device.

FIG. 3 illustrates the side view of an embodiment comprising sensors along the length of the second conveyor 320 positioned on the lateral side panel of the crop collection device 300 from the bottom crop deflection panel 375 and to the rearmost end of the crop collection device 300. As the bale is growing, space between the first and second conveyors 310, 320 may be monitored during operation of the crop collection device 300. For instance, in an operating stage similar to the operating stage depicted in FIG. 2D, as the crop material C approaches the crop deflection panel 375, the operator continuously monitors the transient buildup of crop material C on the second conveyor 320. If the sensor at or proximate to the crop collection device outlet 355 becomes activated by the presence of crop C, then the operator can decide on a real-time basis when to redirect the drive roll of the second, or bottom, conveyor 320 in the direction toward the baling mechanism at a slow speed and to begin forming a new bale in the bale chamber. To avoid clogging or operational malfunction, the operator can engage the new stage of the operational cycle after the bale is ejected from the bale chamber and after transiently stored crop material C reaches a predetermined level in on the second conveyor 320. The sensors of the invention can be any sensor known in the art, but, in some embodiments, the sensors are optical sensors used to determine when a path of light is occluded by the presence of crop material C or other physical object within the crop collection device 300. In some embodiments, the sensors may be optical sensors, ultrasonic sensors, contact sensors, or a combination thereof. In some embodiments, at least one or a plurality of sensors are chosen from: optical sensors, ultrasonic sensors, infrared sensors, contact sensors, or a combination thereof.

Figure 4:
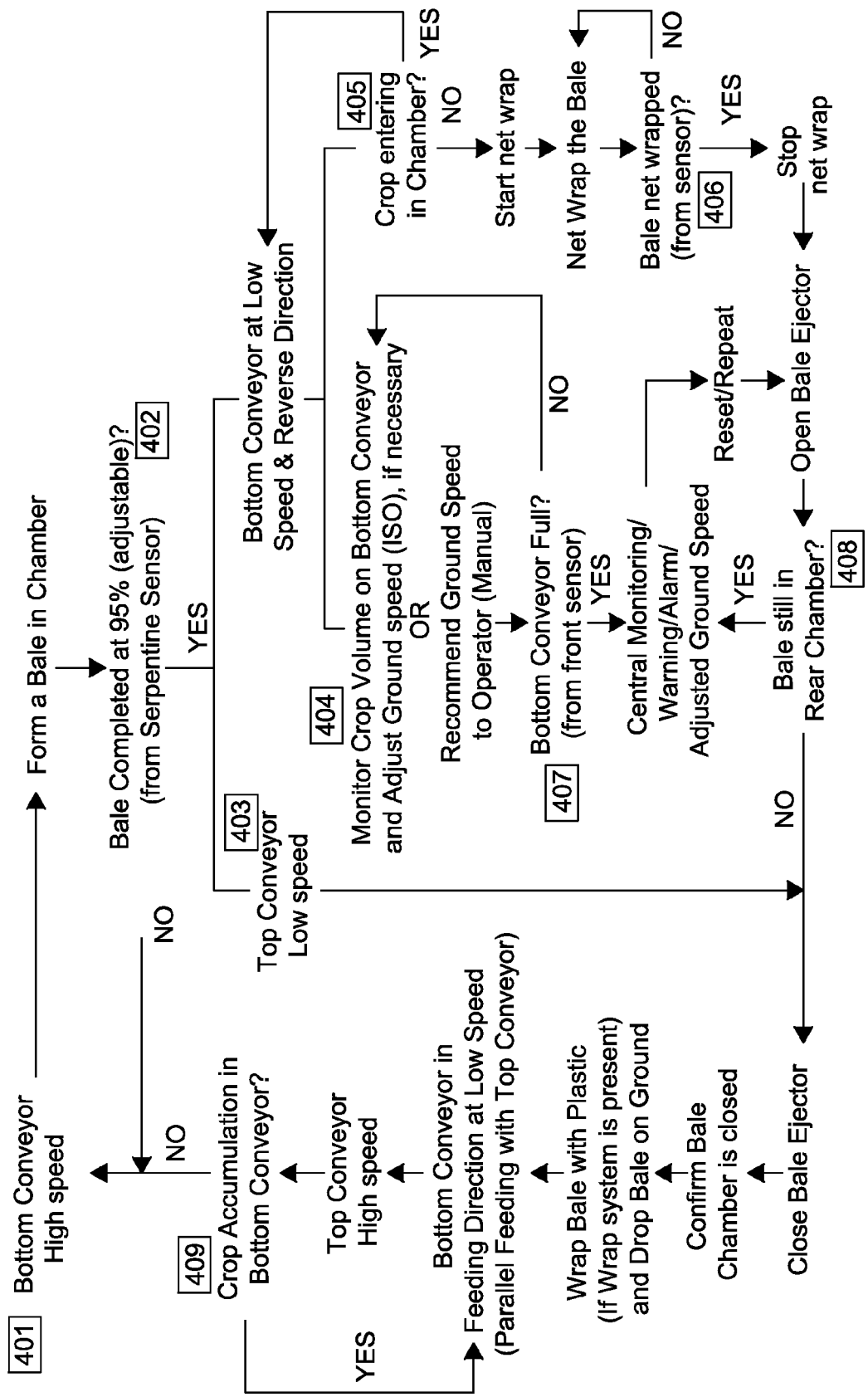
FIG. 4 describes a flowchart illustrating an example of a harvesting procedure according to an embodiment of the invention.

FIG. 4 illustrates an exemplary flowchart showing an operational cycle, or method, of harvester according to an embodiment of the present disclosure. Initially, various operating parameters for the crop collection device may be set by an operator of the crop collection device, or preloaded according to existing operational data related to the device or the baler with which the crop collection device is operable communication. For example, a manufacturer may include a collection of parameters a customer may use to calibrate the crop collection device at the start of each harvesting season or upon changing the crop material being harvested. In some embodiments, such parameters include at least one of: speed of the harvester, a top or bottom speed of at least one conveyor on the crop collection device, a desired bale size and a maximum or minimum time period for net wrapping of the bales, and the speed of the baling belts.

Once the test parameters are set, the operator may begin harvesting 401 where the top and bottom conveyors are both moving in a direction toward an adjacent baling mechanism and at a relatively high and constant rate of speed. Normal formation of the bale chamber occurs. At least one sensor on the crop collection device may measure various performance information (such as mass flow rate of crop material) on its own or in concert with at least one sensor positioned in a bale chamber of a baler aligned with the crop collection device. While harvesting and at a predetermined bale size (in this embodiment, growth of the bale to 95% of its desired size which is detected by sensors positioned in the bale chamber) 402, the operator may engage the crop collection device to slow only the top conveyor 403 in order to prepare for net wrap and bale ejection; or slow the speed of the top conveyor and change of direction and speed of the bottom conveyor of the crop collection device to direct crop material into transient storage on the bottom conveyor belt. A sensor at the rearmost end of the crop collection device and proximate to the crop outlet collects a first data set 405 that identifies whether crop is entering the bale chamber. After receiving the first set of data and confirming that the crop material from the top conveyor is being fully diverted away from the bale chamber, the operator may initiate a net wrapping step. A sensor positioned in the bale chamber determines when the bale is wrapped and ready for ejection 406. An operator may then stop the net wrapping mechanism and initiate a bale ejection phase of the baling method. Simultaneous to the collection of the first set of data 405, at least one or a plurality of sensors monitors and collects a second set of data that identifies whether and how much crop material volume is present on the bottom conveyor 404. The operator may adjust the speed of the agricultural harvester or the speed of either or both of the conveyors of the crop collection device. The speed may also be adjusted automatically by software parameters entered by the operator before operation of the agricultural harvester. If the bottom conveyor becomes full, a sensor at the front of the crop collection device 407 will prompt the operator to reset or repeat the bale ejection method. A sensor 408 positioned in the bale chamber will identify whether the bale is still in the bale chamber. If the bale has not been evacuated, an alarm will notify the operator and/or the software, either of which may then adjust the speed of the harvester and conveyors. If the bale has been evacuated, the operator or controller can redirect the movement of the bottom conveyor toward the crop outlet for new bale formation. The step requires a slow rate of speed assigned to second conveyor so that crop material from the top conveyor does not plug the crop outlet. One or a plurality of sensors at the bottom conveyor can be monitored again for accumulation of crop material 409. Once the sensor data 409 from the bottom conveyor indicates that crop material from the second conveyor has been fully moved to the bale chamber, the speed of the bottom conveyor can be adjusted back to a relatively high speed for bale formation 401. The operating cycle may begin a new iteration.

Figure 5A:
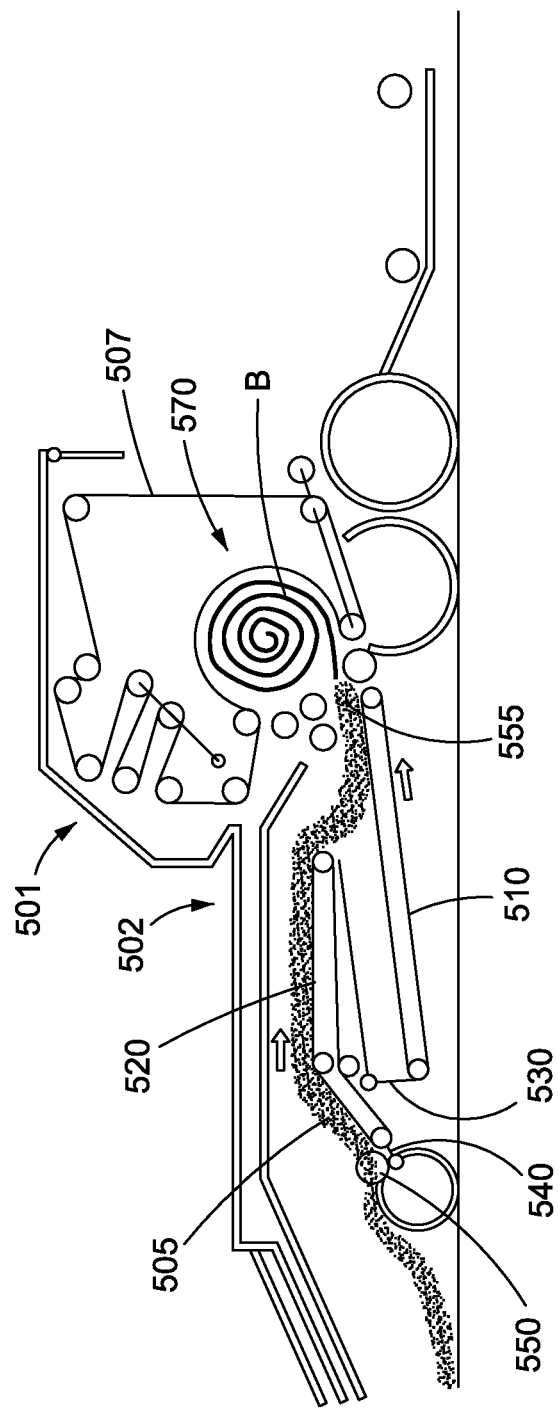
FIG. 5A through FIG. 5D illustrate various stages of harvesting crop material within an agricultural harvester according to an embodiment with a variable baling chamber.
Figure 5B:
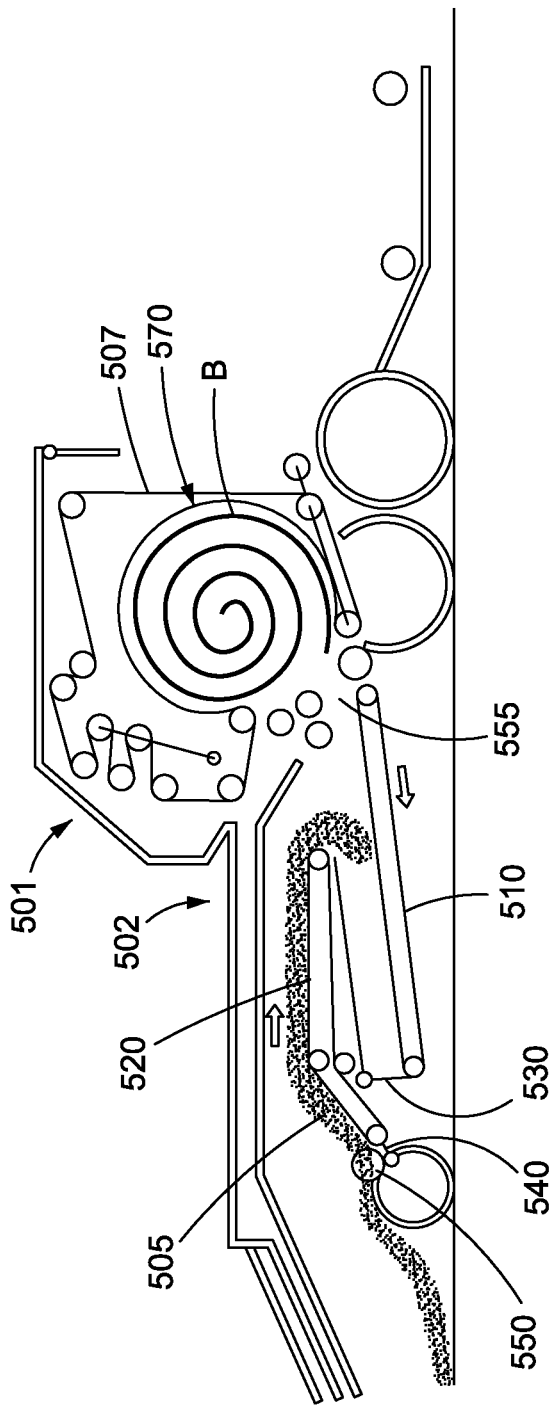
Figure 5C:
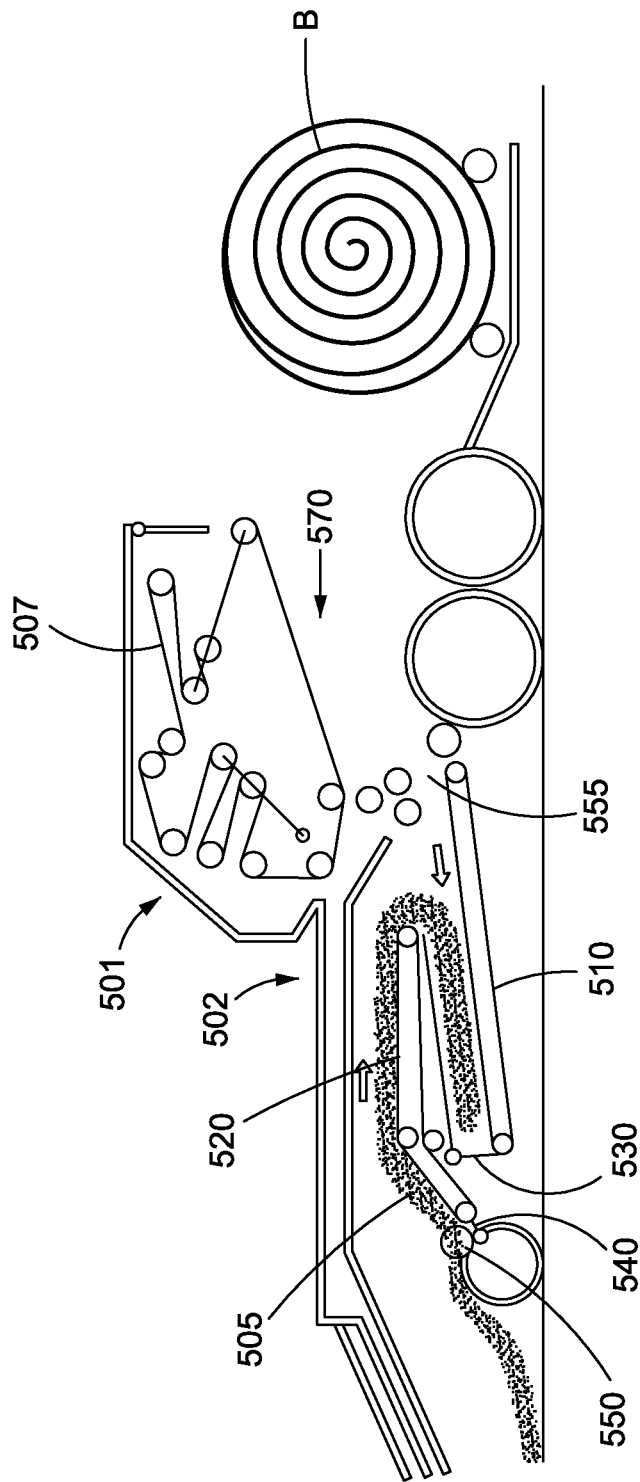
Figure 5D:
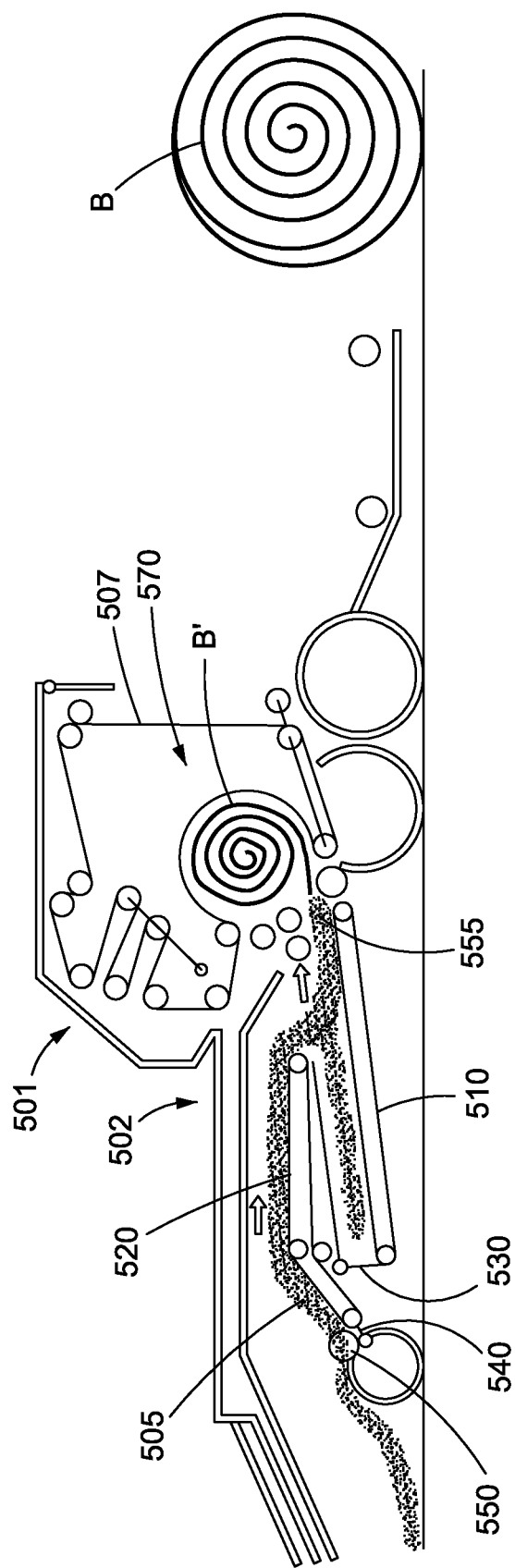

FIG. 5A depicts the side view of a baler 501 comprising a crop collection device 502 and a variable bale chamber 570 in various stages of operation. The variable bale chamber 570 allows for one or a plurality of baling belts 507, which are rotatably mounted on a series of rolls arranged in a serpentine path, to assist in bale formation in the bale chamber 570 being fed by the crop collection device 502. In some embodiments, the baler comprises the bale chamber, bale carrier and serpentine apparatus described in U.S. application Ser. No. 13/784, 133, filed May 5, 2012. The crop collection device 502 comprises a first conveyor 520 with a bidirectional path, a second conveyor 510 adjacent to a crop outlet 555, a forward crop deflection panel 540 and a rear crop deflection panel 530. Crop material 505 is fed into the crop collection device by a pickup assembly 550 positioned in front of the crop collection device 502. FIG. 5A illustrates crop material 505 moving through the pickup assembly 550 over the closed front crop deflection panel 540 and onto the first, or top, conveyor 520 in the direction indicated by the arrow. Crop material 505 falls onto the second, or bottom, conveyor 510 and becomes fed into the bale chamber 570 to form bale B in the direction indicated by the rear-facing arrow. While a bale B is being formed in the bale chamber 570, both conveyors operate at high speed. FIG. 5B depicts the baler 501 in its next operational stage where the bale B reaches its near-full size. The operator redirects the crop material 505 from the first conveyor 520 to the second conveyor 510 that is moving in the forward direction. Crop material 505 begins to flow toward the rear crop deflection panel 530. The operator simultaneously wraps bale B via a conventional bale netting mechanism (not depicted). FIG. 5C depicts ejection of the completely formed bale B while crop material 505 builds up in the forward-most area of the top surface of the second conveyor. The directions of both the first and second conveyors 510, 520 are maintained as indicated by the direction of the arrows. FIG. 5D depicts the baler 501 in an operating stage in which the top surface of the second conveyor 510 has become significantly full of crop material 505. The bale B has been deposited onto the ground while new bale B' begins to be formed by the crop material 505 transiently stored on the surface of the second conveyor 510 and newly harvested crop material 505 sourced from the first conveyor 520. In some embodiments, the bale B' can be deposited on a plastic wrapper.

Figure 6A:
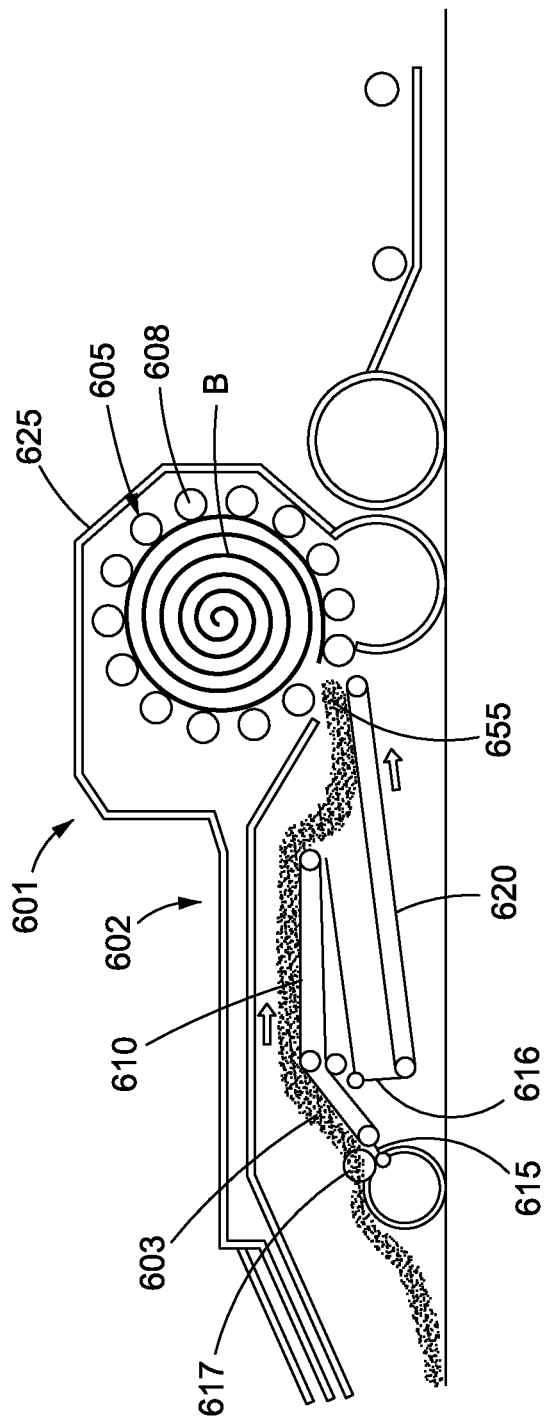
FIG. 6A through FIG. 6D illustrate various stages of harvesting crop material within an agricultural harvester according to an embodiment with a fixed baling chamber.
Figure 6B:
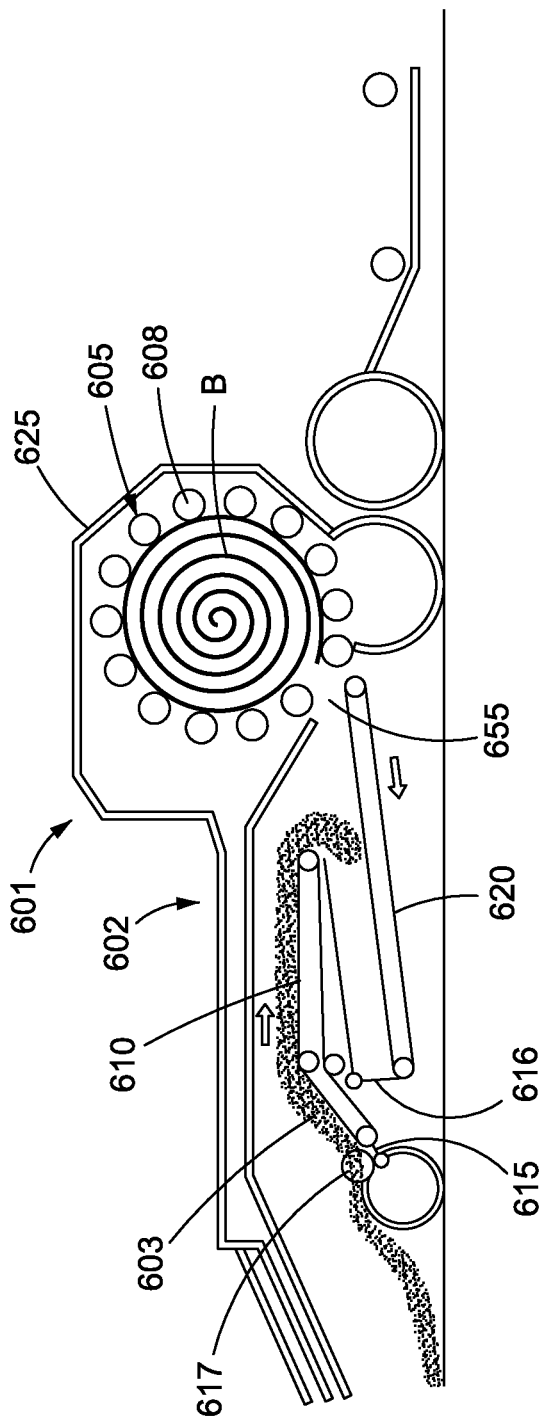
Figure 6C:
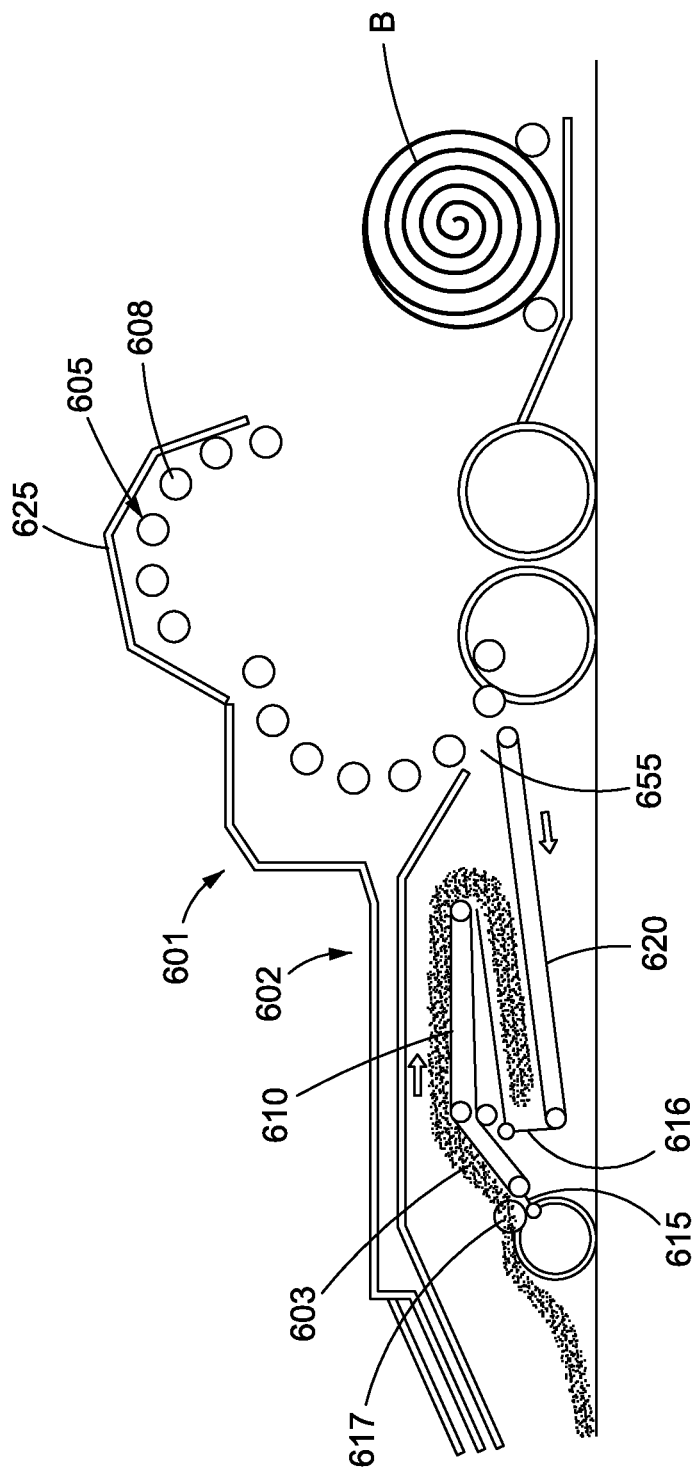
Figure 6D:
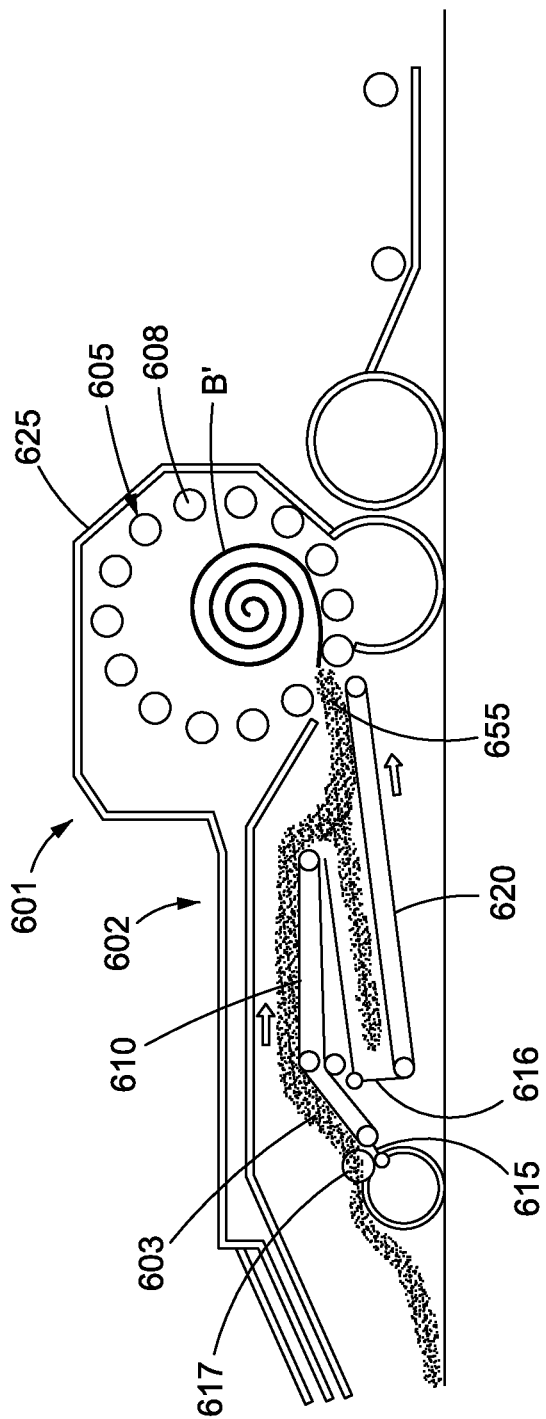

FIG. 6A depicts a side view of an embodiment in which a baler 601 comprises a crop collection device 602 with a conveyor arrangement identical to the conveyor arrangement of FIG. 5. The baler 601, however, comprises a fixed bale chamber 605 comprising a series of rollers 608 arranged in a circular orientation that define a region in which the bale B is formed. While one or a plurality of conveyor belts are rotatably mounted on the set of rollers 608, the positions of the rollers 608 within the baler 601 remain stationary when the tailgate 625 is in its closed position. Crop material 603 enters the crop collection device 602 through the pickup assembly 617 over the gap filled by the forward crop deflection panel 615 and onto the top surface of the first conveyor 610 in the direction indicated by the top arrow. Crop material then flows from the first conveyor 610 onto the top surface of the second conveyor 620 and into the bale chamber 605. The operator can commence bale wrapping by first slowing the speed of the both the first 610 and second 620 conveyors and reversing the direction of the conveyor belts on the second conveyor 620 to redirect the crop material 603 toward the forward area of the crop collection device 602. Arrows near the first 610 and second 620 conveyors in FIG. 6B indicate the direction of the conveyor belts of the first and second conveyors during the net wrapping process. The next sequential operating stage of the embodiment is depicted in FIG. 6C in which the speed and direction of the conveyor belts on the first and second conveyors are maintained (as depicted by the arrows) until ejection of the bale B has been achieved. Before ejection occurs, the baler's tailgate 625 is opened in a conventional fashion. Once ejection has been completed, the tailgate 625 is closed in the operating stage depicted in FIG. 6D. The direction of the movement of the conveyor belts on the second conveyor 620 is reversed as indicated in the arrow underneath the second conveyor 620. The speed of the first conveyor is increased to a relatively high level to begin forming new bale B'. The speed of the second conveyor 620 is maintained at a relatively slow speed until the second conveyor 620 is cleared of crop material 603 so as to prevent jams at the outlet 655 of the crop collection device 602.

Figure 7A:
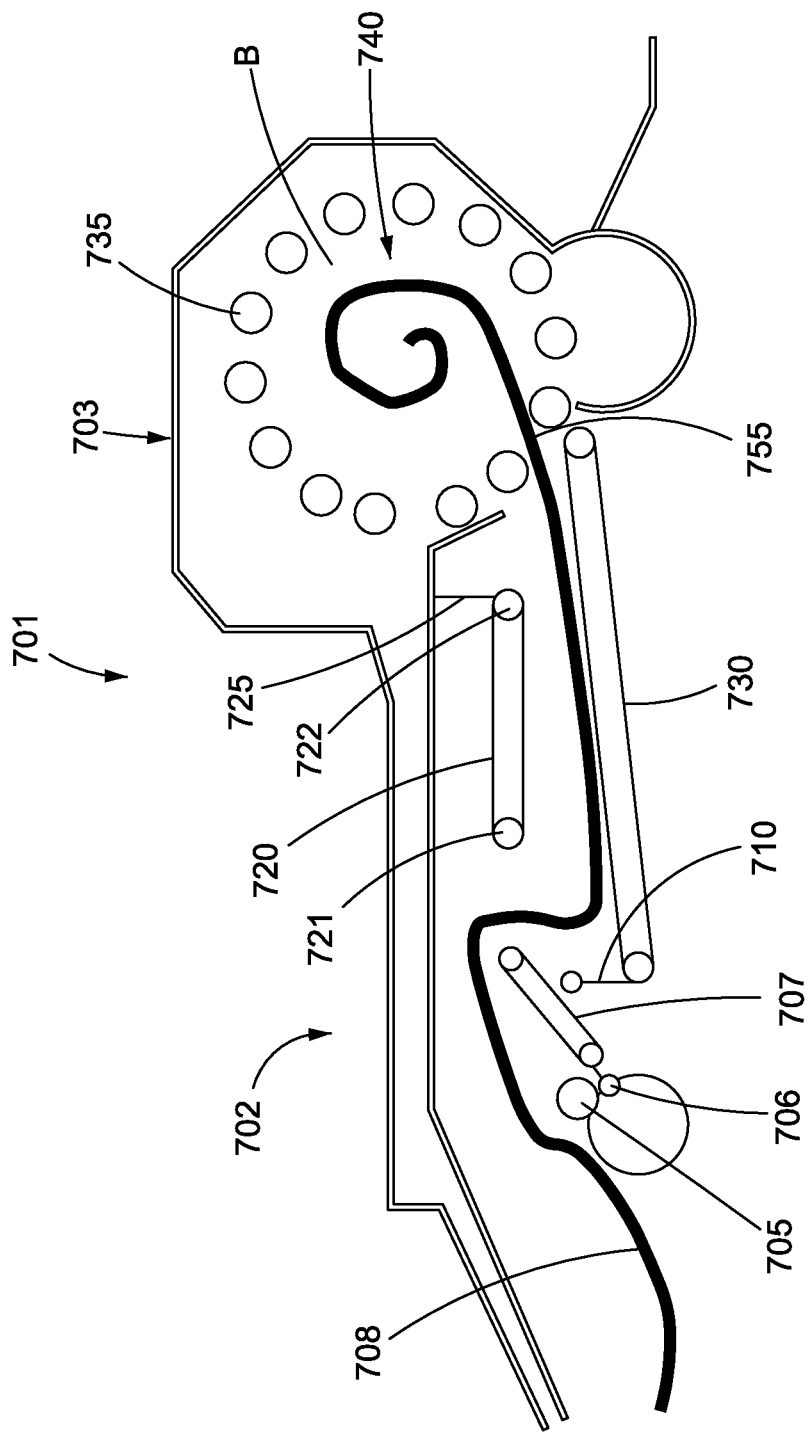
FIG. 7A depicts a side view of an embodiment in which an agricultural harvester comprises a pickup assembly, a crop collection device, and a baling mechanism; wherein the crop collection device comprises a movable conveyor relative to the position of the rolls that determine the position of the movable conveyor in the crop collection device.

FIG. 7A depicts a side view of an embodiment in which a baler 701 harvests crop material 708 through a pickup assembly 705 positioned at the front of the baler 701. The crop material 708 flows from the pickup assembly 705 to a first stationary conveyor 707 in relation to the position of a forward crop deflection panel 706 that remains closed while the baler 701 is harvesting. The terms "stationary conveyor" is used in some embodiments refers specifically to the conveyor position relative to the position of each conveyor's rolls. While one of ordinary skill in the art would appreciate, one or a plurality of conveyor belts rotatably mounted on rolls of the stationary conveyor move. The rolls of the stationary conveyor also rotate to convey the one or plurality of conveyor belts, however, the position of the rolls of a "stationary conveyor" relative to their position within the crop collection device do not change. In contrast, the position of the rolls of a "movable conveyor" may change depending upon the stage in which the harvester is harvesting crop material. The first stationary conveyor 707 is pitched at angle sufficiently positive to transport crop material 708 on its surface to a height above a second stationary, or bottom, conveyor 730 that runs lengthwise in the baler and adjacent to the outlet 755 of the crop collection device 702 and the inlet bale chamber 740. The second stationary conveyor 730 carries crop rearward toward the bale chamber 740 in the operating stage depicted in FIG. 7A. The baler forming mechanism 703 of the baler 701 is a fixed baling chamber in which a plurality of rolls 735 define a circumference around the bale chamber 740 where bale B is formed. The crop collection device 702 also comprises a first movable conveyor 720 that is substantially horizontal and immediately adjacent to a metal plate 725 that is transverse to the movable conveyor 720 at its rearmost end. The conveyor belt or belts of the movable conveyor 720 are rotatably mounted on a forward roller 721 and rear roller 722, both of which spin on their respective axes and at least one of which has a drive roll function independently operable by the operator of the baler 701. Both the forward 721 and rear 722 rollers of the movable conveyor are mounted within horizontal slots (not depicted) on opposite positions within the sidewall of the crop collection device 702 which allow forward movement of the entire conveyor to align itself immediately adjacent to the rear end of the first stationary conveyor 707. The forward movement of the conveyor can be accomplished by a linear cylinder. The movable conveyor 720 and the metal plate, which is also optionally movable in a forward and aft direction to remain adjacent to the movable conveyor 720 during its stages of its operating cycle, define a cavity above the movable conveyor in the top of the crop collection device 702 that transiently holds crop material 708 when the baler 701 is in an operating stage that comprises net wrapping and ejection steps of baling. The transient storage of the crop material 708 allows the baler 701 to bale crop material 708 continuously. In some embodiments, the one or plurality of conveyor belts on the first and second stationary conveyors 707,730 are operable in either the forward or reverse directions. In some embodiments, the one or plurality of conveyor belts on the first and second stationary conveyors 707,730 are operable at adjustable speeds that may be modified manually by the operator of the crop collection device 701 or automatically by predetermined parameters entered by the operator prior to or during the harvesting process. In some embodiments, the one or plurality of conveyor belts on the first and second stationary conveyors are operable at adjustable speeds that may be modified automatically by software that also adjusts the speed of the baler 701 in conjunction with the speed of each of the conveyors to optimize continuous operation of the baler 701. The crop collection system 701 also comprises at least one or a plurality of sensors positioned in the cavity over the movable conveyor 720. The operator may attempt to correct a plug or clog of any of the components of the crop collection system 701 by opening the forward 706 or rear crop deflection panel 710 and attempting to move any substance or objects from the surface of the conveyors through manipulating the direction and speed of the one or plurality of conveyor belts on any of the harvester's conveyors.

Figure 7B:
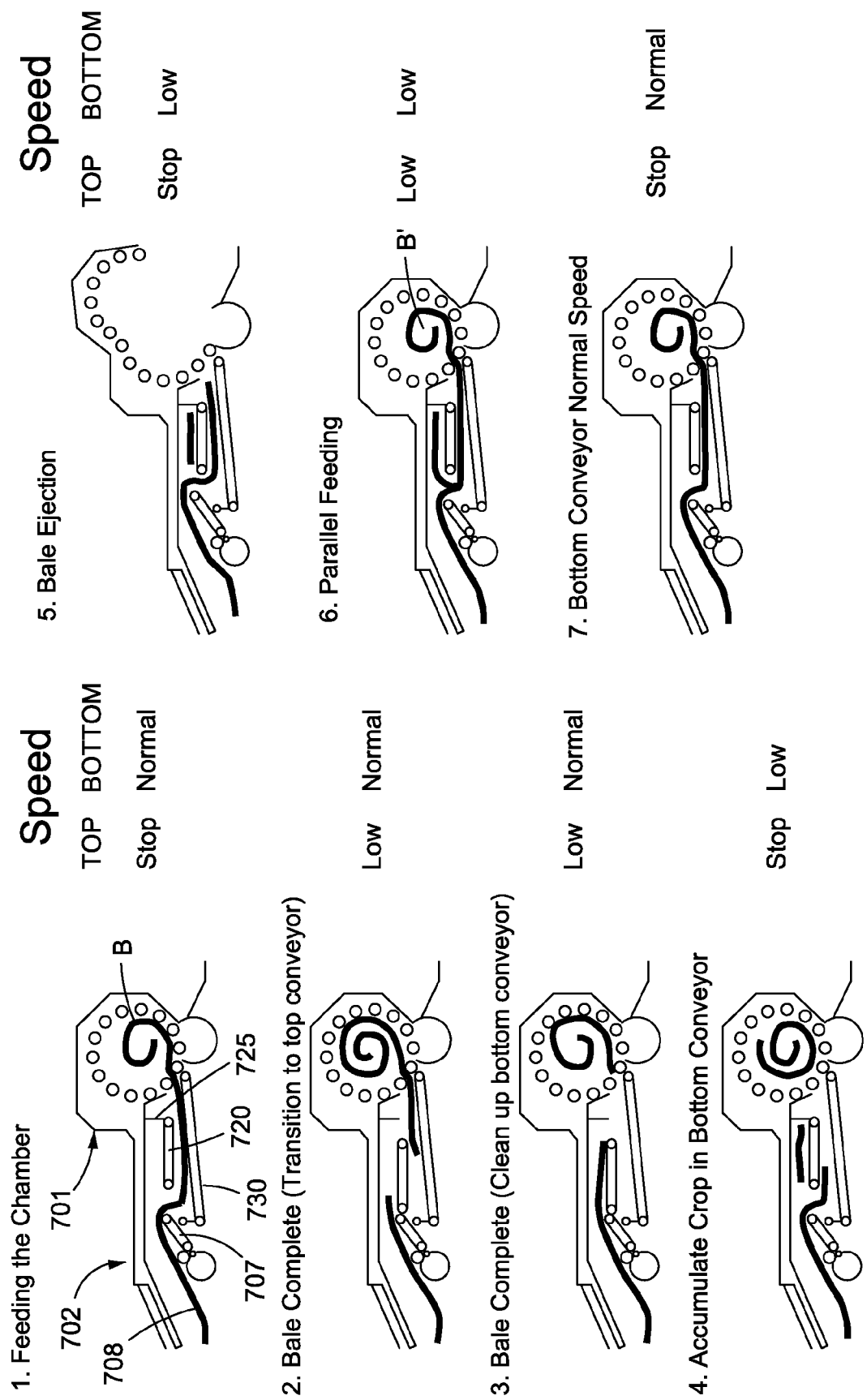
FIG. 7B illustrates stages for harvesting using three conveyors of the crop collection device according to an embodiment with side view schematics of the embodiment.

FIG. 7B depicts a schematic side view of various stages of an operational cycle of an embodiment paired with a designated speed of a first movable conveyor 720 and a second stationary conveyor 730 at each particular stage. A first operating position is depicted in which harvested crop material 708 enters the crop collection device 702 at its front end and proceeds on a path from the first stationary conveyor 707, to the second stationary conveyor 730 in the rearward direction and into the bale chamber 740. Bale B is formed within the bale chamber 740. A second operating position is depicted in which bale B is in the process of being fully formed. The speed of the second stationary conveyor 730 remains at a normal speed and the movable conveyor moves to its frontmost position adjacent to the first stationary conveyor 707. Crop material that has fallen on the stationary second conveyor 730 prior to the movement of the movable conveyor 720 is sent to the bale chamber 740. Crop material 708 just entering the crop collection device 701 flows onto the first stationary conveyor 707 and then onto the movable conveyor 720, the conveyor belt or belts of which begin to operate at a low speed. A third operating position comprises a point at which the formation for bale B is complete. The speed and directions of both the second stationary conveyor 730 and the moveable conveyor 720 remain unchanged. A fourth operating position involves the bale net wrapping step in the bale chamber 740, during which the movement of the conveyor belt or belts on the movable conveyor 720 stop and the movable conveyor 720 itself moves rearward toward its original stationary position. Crop material 708 is continuously harvested and any new crop material 708 on the first stationary conveyor 707 falls onto the second stationary conveyor 730. A fifth operating position involves the bale ejection of bale B from the bale chamber 740. Crop material continues to build on the second stationary conveyor 730, the speed of which is maintained at a relatively low rate. The crop material on the movable conveyor 720 remains motionless until the bale B becomes ejected from the bale chamber 740. A sixth operating position comprises initiating the movement of the conveyor belt or belts on the movable conveyor 720 in rear direction and at a low speed. New bale B' begin forming from the crop material 708 that has built up on the second stationary conveyor. The second stationary conveyor 730 remains at a low speed to reduce the likelihood of clogging the crop outlet of the crop collection device 702 by accommodating transiently stored crop material being sent to the second stationary conveyor 730 from the movable conveyor 720. Once all of the crop material 708 transiently stored on the movable conveyor 720 has been directed to the second stationary conveyor 730, the operator or software may stop the conveyor belt or belts of the movable conveyor 720 and return the speed of the belt of belts of the second stationary conveyor 730 to a normal, rear-directional speed. Bale formation of new bale B' can then proceed to the first stage of the crop collection device's 702 operating cycle.

Figure 7C:
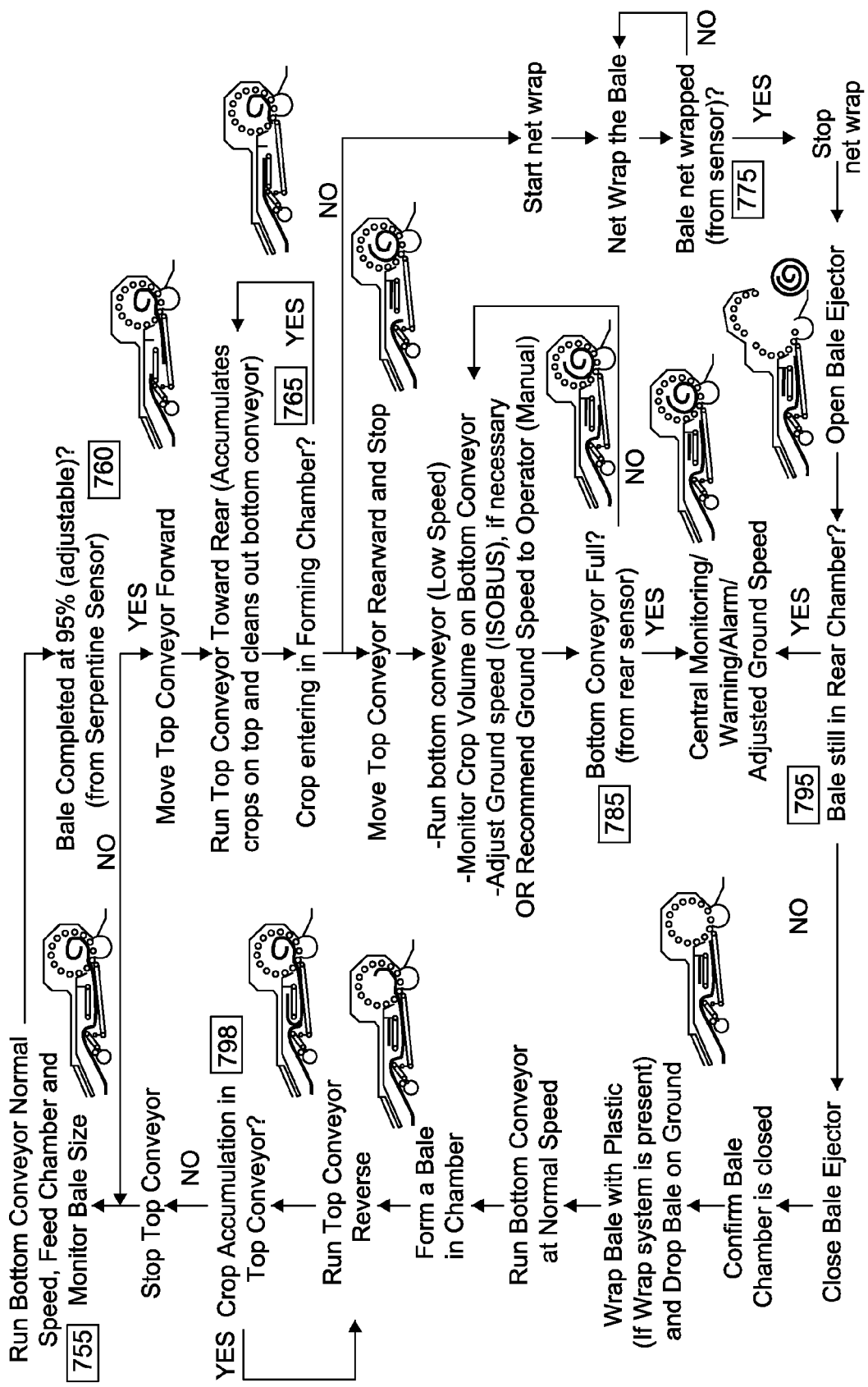
FIG. 7C depicts a flowchart illustrating an example of a harvesting procedure according to an embodiment of the invention.

FIG. 7C depicts a flowchart of operator conditions and sensor outputs associated with the schematics of the baler 701 at various stages of operation in the operating cycle depicted by FIG. 7B. At the first operational stage of the baler 755, crop materials are being fed into the bale chamber. A sensor positioned in the bale chamber indicates when the bale is at about 95% of its desired size 760. At a third operational stage of the operating cycle, a sensor located at or near the crop outlet of the crop collection device 765 prompts the operator when crop material from the second stationary conveyor has been fully cleared. The operator may then stop movement of the movable conveyor's conveyor belt or belts and engage movement of the first movable conveyor to its rear-most position. Simultaneously, a bale net wrapping mechanism can be engaged and, when a sensor identifies when the bale net wrapping step is complete 775, the operator may initiate bale ejection. The operator can also monitor the amount of crop material building in the second stationary conveyor in the fourth and fifth operational stages of the operating cycle by a sensor or sensors positioned on or proximate to the second stationary conveyor 785. Once the sensor or sensors in the bale chamber indicates that the bale B has been ejected 795, the operator may commence a new baling cycle by parallel feeding the second stationary conveyor by the crop material on the movable conveyor and crop material from the first stationary conveyor. In the depicted embodiment, crop material from the moveable conveyor is directed by forward movement of the conveyor belt or belts at low speed. A sensor or sensors located at or proximate to the moveable conveyor 798 detect when the transiently stored crop material is fully moved to the second stationary conveyor. At that point, the operator may decide to stop movement of the conveyor belt or belts on the moveable conveyor and increase the speed on the second stationary conveyor.

Figure 8:
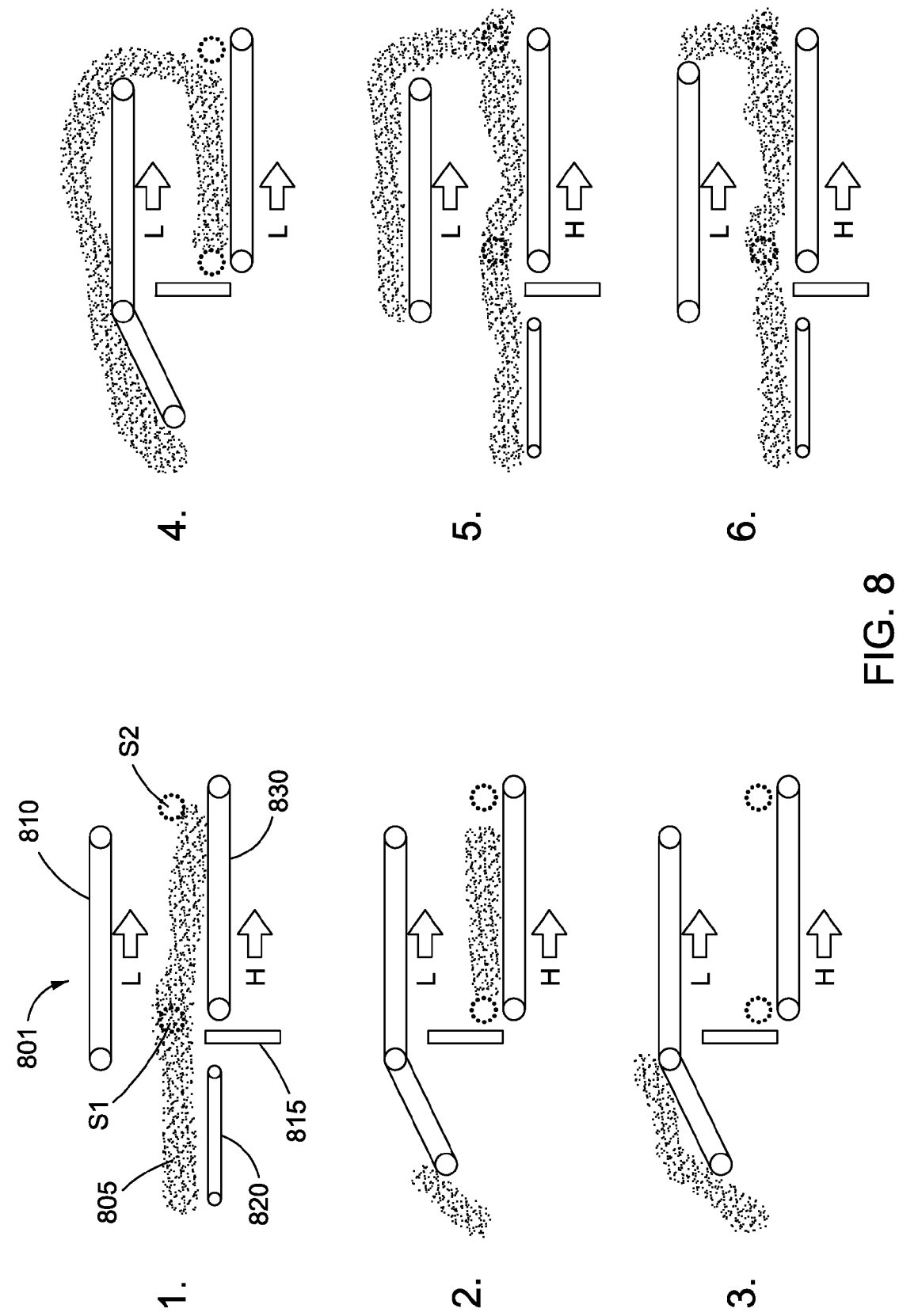
FIG. 8 illustrates stages for harvesting using three conveyors of the crop collection device according to an embodiment.

FIG. 8 depicts an embodiment in which the crop collection device 801 comprises a first stationary conveyor 810 positioned substantially over a second stationary conveyor 830. The crop collection device 801 also comprise a moveable conveyor 820 but, unlike the moveable conveyor depicted in FIG. 7, the moveable conveyor of FIG. 8 is positioned at the front of the crop collection device and receives crop material directly from a pickup assembly (not shown) in front of the crop collection device 801 or from another crop source forward from the moveable conveyor 820. The moveable conveyor 820 begins its operational cycle in a substantially horizontal position and at a high speed feeding an aligned second, or bottom, stationary conveyor 830 with crop material 805. A crop deflection panel 815 rests in an open position between the moveable conveyor 820 and the second stationary conveyor 830. The crop deflection panel 815 is operably connected to a controller (not shown) which directs its movement in the path of the crop material 805 moving on the top surface of both the moveable conveyor 820 and the second stationary conveyor 830. A first sensor S1 is positioned at or proximate to the forward most position of the second stationary conveyor 830. A second sensor S2 is positioned at or near the rearmost position of the second stationary conveyor 830. In a first stage of an operating cycle, both the moveable conveyor 820 and the second stationary conveyor 830 are set on a relatively high speed in the rear direction and are adapted to align the crop collection system 801 to a bale chamber (not depicted behind the second stationary conveyor 830). In a second stage of an operating cycle of the crop collection system 801 when the bale (not depicted) reaches a predetermined size in preparation for ejection, the speed of the moveable conveyor 820 can be adjusted to low speed and the moveable conveyor is raised to feed the first stationary conveyor 810, which is also running at low speed. The crop deflection panel 815 is raised at the front end of the second stationary conveyor 830 while crop material begins to climb the moveable conveyor 820. At a third stage of an operational cycle, the surface of the second stationary conveyor 830 is cleared into the bale chamber (not shown). A signal from sensor S2 prompts the operator to initiate a fourth stage of an operational cycle in which the operator may begin bale wrapping, slow the speed of the second stationary conveyor 830, and reverse the direction of the belt or belts on the second stationary conveyor 830. Crop material 805 sourced from the front end of the crop collection device 801 continues to climb the moveable conveyor 820 and is directed onto the first stationary conveyor 810 and then subsequently to the second stationary conveyor 830 where it may be transiently stored. The crop deflection panel 815 prevents the crop material 805 from falling from the top surface of the second stationary conveyor 830. Sensors S1 and S2 can be monitored by the operator while a completed bale in the bale chamber is wrapped and ejected to manage the speed of each belt or belts of the crop collection device 801. A fifth stage of parallel feeding the bale chamber can occur by the operator reversing the direction of the belt of belts on the second stationary conveyor 830, dropping the moveable conveyor 820 to be aligned with the second stationary conveyor 830, and moving the crop deflection panel 815 out of the path of incoming crop material 805. Slow speed of both the first and second stationary conveyors 810,830 is performed until the first stationary conveyor 810 is cleared of the crop material 805 on its surface. When the first stationary conveyor 810 is cleared of crop material 805 the speed of the moveable conveyor 820 and second stationary conveyor 830 may be increased to fill the bale chamber at a faster rate without plugging the system.

In some embodiments the agricultural harvester is a baler with a round bale chamber. Agricultural balers, such as round balers, are well known in the agricultural industry, and the instant invention can be adapted to align a crop outlet of the crop collection device to a bale chamber inlet of substantially any of such machines. Reference is made, for example, to U.S. Pat. Nos. 8,291,687; 8,281,713; 8,230,663; 7,918,069; 7,779,755; 7,631,716; 7,568,425; 7,331,280; 7,380,496; 7,275,360; 7,222,566; 6,675,561; 6,688,092; 6,644,006; 6,295,797; and 5,941,168 that illustrate such balers, the disclosures of which is incorporated herein by reference in their entirety. In some embodiments, the pickup assemblies of the cited literature can be replaced by the crop collection device of the instant invention. Embodiments of the present invention are particularly well suited, but in no way limited to, use with agricultural balers. The present invention may also may be adapted to align with, or be onboard, a waste baler, a cotton harvester, a sugarcane harvester or a combine. In some embodiments, a combine may provide a crop material source and feed the front end of the crop collection device. In some embodiments, the agricultural harvester comprises a combine component, a crop collection device and a baling mechanism comprising a bale chamber. In such embodiment, a feed tub behind the threshing rotor of a combine may direct harvested crop material from the combine to the crop collection device of the present invention which is adapted for alignment with any known or substantially any known baling chamber. In such embodiment, a feed tub of a combine may direct harvested crop material from the combine to the crop collection device of the present invention which is adapted for alignment with any known or substantially any known baling chamber. In some embodiments, the agricultural harvester may comprise a tractor that pulls a crop collection device of the present invention which is adapted on its front end to align with a pickup assembly known in the art and adapted on its rear end to align with any known or substantially any known baling mechanism.

In some embodiments, the invention relates to an agricultural harvester comprising a crop collection device and a bale ejection system; wherein the bale ejection system comprises: a bale chamber comprising a first sidewall and a second sidewall; an outlet at the rear end of the bale chamber; and a bale carrier positioned over the outlet, the bale carrier movable among a closed position and one or more open positions, comprising: a first pair of arms extending transversely from and affixed to a first pair of pivot points on the first and second sidewalls; one or more fixed members; and a pair of bars affixed to the one or more fixed members. In some embodiments the pair of bars are aligned in a parallel fashion. In some embodiments, bale carrier has at least two fixed members, at least three fixed, or at least four fixed members. In some embodiments, the invention relates to an agricultural harvester comprising a crop collection device and a bale ejection system; wherein the bale ejection system comprises: a bale chamber comprising a first sidewall and a second sidewall; an outlet at the rear end of the bale chamber; and a bale carrier positioned over the outlet, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members; and a pair of bars affixed to the one or more fixed members. In some embodiments the pair of bars are aligned in a parallel fashion.

In some embodiments, the invention relates to an agricultural harvester comprising a crop collection device and a bale ejection system comprising: a bale chamber defined by a first sidewall and a second sidewall and comprising an outlet at the rear end of the bale chamber; and a bale carrier positioned over the outlet, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance from the first and second pair of pivot points defined by the length of the first and second pair of arms; and a pair of bars affixed to the one or more fixed members. In some embodiments the pair of bars are aligned in a parallel fashion.

In some embodiments, the bale ejection system is the bale ejection system described in U.S. application Ser. No. 13/308,304, filed Nov. 30, 2011, or U.S. application Ser. No. 13/784,133, filed May 5, 2012, which are incorporated herein in their entireties. In some embodiments the bale ejection system of the present invention comprises a bale carrier described in U.S. application Ser. No. 13/308,304, filed Nov. 30, 2011, or U.S. application Ser. No. 13/784,133, filed May 5, 2012, or a component thereof. In some embodiments, the harvester of the present invention is a baler that comprises a variable bale chamber or a fixed bale chamber.

In some embodiments, the bale ejection system comprises: a bale chamber comprising a first sidewall and a second sidewall; an outlet at the rear end of the bale chamber; and a bale carrier obstructing the outlet, the bale carrier movable among a closed position and one or more open positions, comprising: a first pair of arms extending in parallel transversely from and affixed to a first pair of pivot points on the first and second sidewalls; a second pair of arms extending transversely from and affixed to a second pair of pivot points on the first and second sidewalls; one or more fixed members; and a pair of parallel bars affixed to the one or more fixed members.

In some embodiments, the invention relates to an agricultural harvester comprising a crop collection device and a bale ejection system comprising: a fixed member positioned above the bale carrier for feeding or retracting a flexible material attached to a face of the bale carrier most distal to the flexible member. The function of the flexible material is designed to protect the baling belts from outside incursion or disturbance and to prevent the operator or other individuals standing near the rear of the bale system from becoming injured by the bale ejection system while it is in operation. In some embodiments, the flexible member comprises a spring-loaded roller for feeding or retracting the flexible material. In some embodiments, the flexible member is operably coupled to at least one motor for facilitating the feeding or retraction of the flexible material. In some embodiments, the flexible material is affixed to the bale carrier at the pair of bars at a first position distal to the flexible member.

In some embodiments, the invention relates to an agricultural harvester comprising a crop collection device and a bale ejection system comprising one or more fixed members that comprise at least a first roller; wherein the pair of bars are affixed to each end of the first roller on a set of rotatable axes. In some embodiments, the invention relates to the one or more fixed members that comprise at least a first roller and a second roller; wherein the pair of bars are affixed to each end of the first roller and the second rollers on a set of rotatable axes. In some embodiments, the invention relates to a baler ejection system with one or more fixed members that comprise at least a first roller; wherein the pair of bars are affixed to each end of the first roller on a set of rotatable axes and wherein the pair of bars are oriented in parallel to one another. In some embodiments, the invention relates to the one or more fixed members that comprise at least a first roller and a second roller; wherein the pair of parallel bars extends orthogonally to and are affixed to each end of the first roller and the second rollers on a set of rotatable axes. In some embodiments, the invention relates to a baler ejection system with one or more fixed members that comprise at least a first roller, a second roller, and a third roller; wherein the pair of bars is affixed to each end of the first roller, the second roller, and the third roller on a set of rotatable axes. In some embodiments, the invention relates to a baler ejection system with one or more fixed members that comprise at least a first roller, a second roller, and a third roller; wherein the pair of parallel bars extends orthogonally to and is affixed to each end of the first roller, the second roller, and the third roller on a set of rotatable axes.

In some embodiments, the invention relates to an agricultural harvester comprising a crop collection device and a bale ejection system comprising: a bale chamber comprising a first sidewall and a second sidewall; an outlet at the rear end of the bale chamber; and a bale carrier, the bale carrier movable among a closed position and one or more open positions, comprising: a first pair of arms extending transversely from and affixed to a first pair of pivot points on the first and second sidewalls; a second pair of arms extending in transversely from and affixed to a second pair of pivot points on the first and second sidewalls; one or more fixed members; and a pair of bars affixed to the one or more fixed members; and a one or a plurality of baling belts to convey rotation of a bale in the bale chamber in operable contact to a fourth roller positioned above the bale carrier, wherein the fourth roller imparts tension to the baling belts; wherein the first roller takes up slack in the baling belts when the bale carrier pivots upward at any angle from its closed position and provides slack in the one or plurality of baling belts when the bale carrier pivots downward from an open position; wherein the second roller deflects contact between the one or plurality of baling belts and wherein the third roller conveys tension to the one or plurality of baling belts whereby it positions the one or plurality of baling belts in operable contact with the bale when the bale carrier is in its closed position. In some embodiments, the first pair of arms and/or the second pair of arms is operably coupled to a hydraulic system for facilitating upward movement of the first pair of arms and/or the second pair of arms around the first and second pair of pivot points. In some embodiments, the bale ejection system further comprises a lowermost roller that supports the weight of the bale in the bale chamber and facilitates rotation of the bale. In some embodiments, when the bale carrier is in its fully open position, the lowermost roller is positioned above the any partially or fully formed bale in the bale chamber. In some embodiments, the bale ejection system of the present invention is designed for use in an agricultural harvester, such as a round baler, a waste baler, a cotton harvester, or a combine.

In some embodiments, the bale ejection system uncovers the outlet at one end of the bale chamber through which the bale becomes ejected from the bale chamber when the bale carrier is raised upward to a partially open or fully open position from its closed position. In some embodiments, the bale ejection system further comprises a plate that defines an outward face of retractable bale carrier. In some embodiments, the plate fully covers the one or plurality of baling belts while the baling belts are in operation.

In some embodiments, the invention relates to an agricultural harvester comprising a crop collection device and a bale ejection system, wherein the bale ejection system comprises a bale chamber comprising a first sidewall and a second sidewall; an outlet at the rear of the bale chamber; and a bale carrier, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members; and a pair of bars affixed to the one or more fixed members, wherein the bale carrier uncovers the outlet at the rear of the bale chamber through which the bale becomes ejected from the bale chamber when the bale carrier is raised upward from its closed position.

In some embodiments, the invention relates to a baler comprising a crop collection system and a bale chamber comprising a first sidewall and a second sidewall; an outlet at the rear of the bale chamber; and a bale carrier, the bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members; and a pair of bars affixed to the one or more fixed members, wherein the bale carrier uncovers the outlet at the rear of the bale chamber through which the bale becomes ejected from the bale chamber when the bale carrier is raised upward from its closed position; and wherein the bale chamber is defined in a space between the first sidewall, the second sidewall, the bale carrier, and a plurality of rollers positioned between and attached to the first and second sidewalls; wherein the plurality of rollers support one or a plurality of baling belts.

In some embodiments, the invention relates to a baler comprising a bale chamber comprising a first sidewall and a second sidewall; an outlet at the rear of the bale chamber; and a bale carrier, the bale carrier movable among a closed position and one or more open positions, comprising: a first pair of arms extending in parallel transversely from and affixed to a first pair of pivot points on the first and second sidewalls; a second pair of arms extending in parallel transversely from and affixed to a second pair of pivot points on the first and second sidewalls; one or more fixed members; and a pair of parallel bars extending orthogonal to and affixed to the one or more fixed members, wherein the bale carriers uncovers the outlet at the rear of the bale chamber through which the bale becomes ejected from the bale chamber when the bale carrier is raised upward from its closed position.

In some embodiments, the baler further comprises a motor operatively coupled to the first pair of arms and/or the second pair of arms for facilitating the upward or downward movement of the bale carrier.

In some embodiments, the invention relates to an agricultural harvester that comprises the bale ejection system described herein. In some embodiments, the agricultural harvester is a machine chosen from: a combine, a round baler, a waste baler, a cotton harvester, or a sugarcane harvester.

The aforementioned examples are intended to illustrate, not to limit, the invention. Each of the various publications, including patents and published patent applications, that are cited throughout the application are incorporated by reference in their entireties.

What is claimed is:

1. A crop collection device comprising
at least a first conveyor,
a second conveyor,
a crop inlet positioned at a front end of the crop collection device, and a crop outlet positioned at a rear end of the crop collection device;
wherein the first and second conveyors each comprise at least one conveyor belt rotatably mounted on a set of rolls; and
a controller operably connected to a drive arrangement comprising at least one drive roll positioned for driving the at least one conveyer belts of the first and second conveyer, wherein the controller through the drive arrangement is configured to move at least one of the at least one conveyer belt of the first conveyer and the at least one conveyer belt of the second conveyer for movement of the contacting crop in a fore and aft direction independent of a direction of movement the drive system is driving the movement of the at least one conveyer belt of the other conveyer in a first direction conveying contacting crop rearward toward the outlet and a second direction away from the outlet accumulating contacting crop direction.

2. The crop collection device of claim 1, wherein the at least one drive roll comprises a first and second drive roll and the conveyer belt of the first conveyer and the at least one conveyer belt of the second conveyer are independently driven by the respective first and second drive rolls wherein the first and second drive rolls are operably connected to the controller, wherein the controller is configured to control at least one of the speed and direction of at least one of the conveyers independently of the other conveyer, wherein the controller is configured to control at least one of the first and second drive rolls to change at least one of the speed and direction changing from a feeding arrangement to an accumulating arrangement.

3. The crop collection device of claim 1, wherein at least a portion of the first conveyor is positioned above the second conveyor and configured to feed material from an upper surface of the first conveyor to the second conveyor.

4. The crop collection device of claim 1, wherein the crop outlet is adapted for alignment with an inlet of a bale chamber on an agricultural harvester.

5. The crop collection device of claim 1, wherein at least one of the first and second conveyers is supported by a frame for movement between a first position and a second position in the fore aft direction, wherein movement of the at least one of the first and second conveyers to a first position opens a crop flow path to the outlet and movement to a second position opens a crop flow path to an accumulation position.

6. The crop collection device of claim 5, wherein the crop inlet is adapted for alignment with an outlet of a pickup assembly or for alignment with a feed tube of a combine.

7. The conveyor of claim 1, wherein the first conveyor comprises at least a first and a second section;
    wherein the first section is angled upward from and proximate to the front end of the crop collection device and wherein the first section is defined by a roll at the first section's most frontward point to an inflection point on the conveyor; and
    wherein a second section is substantially horizontal or at a slight angle downward and is positioned above the second conveyor;
    and wherein the first section is positioned and configured to feed crop material from the inflection point to at least one of the second section and the second conveyor.

8. The crop collection device of claim 1, wherein the crop collection device comprises at least one crop deflection panel that is independently movable on a pivot point positioned at the frontward end of the second conveyor between the first and second conveyors in its closed position.

9. The crop collection device of claim 1, wherein the at least one crop deflection panel is configured to allow harvested crop material to clear the second conveyor when the at least one crop deflection panel is in an open position and the one or a plurality of conveyor belts on the second conveyor is moving in a frontward direction.

10. The crop collection device of claim 1, further comprising: (a) an auger or a chopper; and (b) a pickup assembly.

11. The crop collection device of claim 1, wherein the second conveyor is positioned substantially horizontally underneath the first conveyor and is mounted to a frame such that it is independently positionable in the forward and aft directions with respect to the first conveyer in at least two positions.

12. The crop collection device of claim 1, further comprising at least one controller configured to vary the speed and direction of movement of the at least one conveyor.

13. An agricultural harvester comprising:
    a bale chamber comprising a first sidewall and a second sidewall;
    an inlet at the front of the bale chamber
    an outlet at the rear of the bale chamber; and
    a crop collection device adapted for alignment with the inlet of the bale chamber;
    wherein the crop collection device comprises at least a first conveyor comprising at least one first conveyer belt mounted on a first set of rolls, a second conveyor comprising at least one second conveyer belt mounted on a second set of rolls, a crop inlet positioned at a front end of the crop collection device, and a crop outlet positioned at a rear end of the crop collection device; and
    a drive arrangement comprising at least one drive roll, wherein the at least one drive roll forms part of at least of the first set of rolls and the second set of rolls;
    a controller operably connected to the at least one drive roll, wherein at least one of the first conveyer belt and the at least one second conveyer belt is independently movable of the other at least one conveyer belt by the drive roll to convey contacting crop in a forward and aft direction, wherein the controller is configured to control the drive roll to move the at least one independently movable belt in a first direction to convey contacting crop toward the outlet for a crop conveying configuration and in a second direction for a crop accumulating configuration.

14. The agricultural harvester of claim 13, wherein agricultural harvester further comprises a bale carrier movable among a closed position and one or more open positions, comprising:
    at least a first pair of arms extending transversely from and affixed to a first pair of pivot points on the first and second sidewalls;
    one or more fixed members positioned at a distance defined by the length of the first pair of arms; and
    a pair of parallel bars affixed to the one or more fixed members.

15. The agricultural harvester of claim 13, wherein the agricultural harvester is selected from a round baler, cotton harvester, waste baler, or combine.

16. The agricultural harvester of claim 13, wherein the agricultural harvester is a baler and wherein the bale chamber is defined in a space between the first sidewall, the second sidewall, a plurality of rollers positioned between and attached to the first and second sidewalls; wherein the plurality of rollers support one or a plurality of baling belts.

17. The agricultural harvester of claim 13, wherein the agricultural harvester is a baler that comprises:
    a. a bale carrier comprising:
       at least a first pair of arms extending transversely from and affixed to a first pair of pivot points on the first and second sidewalls; one or more fixed members positioned at a distance defined by the length of the first pair of arms,
    b. a motor; and
    c. at least one tensioning actuator operatively coupled to the first pair of arms for facilitating the upward or downward movement of the bale carrier.

* * * * *